United States Patent [19]

Hasegawa et al.

[11] Patent Number: 4,891,690
[45] Date of Patent: Jan. 2, 1990

[54] COLOR IMAGE READING APPARATUS WITH PLURAL LINEAR SENSORS WHICH CAN READ DIFFERENT LINES OF THE IMAGE

[75] Inventors: Shizuo Hasegawa, Tokyo; Nobuo Matsuoka, Kawasaki, both of Japan

[73] Assignee: Canon Kabushiki Kaisha, Tokyo, Japan

[21] Appl. No.: 193,227

[22] Filed: May 11, 1988

Related U.S. Application Data

[63] Continuation of Ser. No. 804,110, Dec. 3, 1985, abandoned.

[30] Foreign Application Priority Data

Dec. 4, 1984 [JP] Japan .............................. 59-256752
Dec. 4, 1984 [JP] Japan .............................. 59-256755
Dec. 4, 1984 [JP] Japan .............................. 57-256756

[51] Int. Cl.$^4$ .......................... H04N 1/46; H04N 1/40
[52] U.S. Cl. ...................................... 358/75; 358/443; 358/494
[58] Field of Search ................ 358/75, 293, 280, 294

[56] References Cited

U.S. PATENT DOCUMENTS

| | | | |
|---|---|---|---|
| 4,368,484 | 1/1983 | Stemme et al. | 358/75 |
| 4,462,043 | 7/1984 | Saitou | 358/75 |
| 4,553,160 | 11/1985 | Yamamoto et al. | 358/75 |
| 4,558,357 | 12/1985 | Nakagawa et al. | 358/75 |
| 4,589,035 | 5/1986 | Yamanishi et al. | 358/75 |
| 4,667,227 | 5/1987 | Ikeda | 358/75 |
| 4,679,073 | 7/1987 | Hayashi | 358/75 |
| 4,691,114 | 9/1987 | Hasegawa et al. | 358/293 |
| 4,716,456 | 12/1987 | Hosaka | 358/75 |
| 4,734,762 | 3/1988 | Aoki et al. | 358/75 |
| 4,734,787 | 3/1988 | Hayashi | 358/293 |
| 4,742,240 | 3/1988 | Yamanishi et al. | 358/293 |

FOREIGN PATENT DOCUMENTS

| | | | |
|---|---|---|---|
| 0107506 | 5/1984 | European Pat. Off. | 358/75 |
| 3004717 | 8/1981 | Fed. Rep. of Germany . | |
| 129868 | 10/1980 | Japan | 358/75 |
| 170668 | 10/1982 | Japan | 358/75 |
| 58-114668 | 7/1983 | Japan | 358/280 |
| 165478 | 9/1983 | Japan | 358/75 |
| 59-105762 | 6/1984 | Japan | 358/293 |
| 46170 | 3/1985 | Japan | 358/75 |
| 120657 | 6/1985 | Japan | 358/75 |

OTHER PUBLICATIONS

K.-A. Springstein, *Elektronische Bildverarbeitung von A-Z*, Verlag Beruf +Schule, Itzehoe, Federal Republic of Germany, 1982, pp. 56-61.

*Primary Examiner*—James J. Groody
*Assistant Examiner*—Randall S. Svihla
*Attorney, Agent, or Firm*—Fitzpatrick Cella Harper & Scinto

[57] ABSTRACT

A color image reading apparatus includes a plurality of linear sensors, each capable of generating plural analog color component signals. The sensors are arranged to read a line of the color image in a divided manner and such that adjacent ones of the linear sensors read mutually different lines of the color image. Also provided is a separator for separating the plural analog color component signals generated by the sensors into analog color component signals of each color, and a converter for converting the analog color component signals of each color into digital color component signals of each color, respectively. The apparatus further includes a device for forming plural continuous digital color component signals representing a line of the color image from the digital color component signals of each color converted by the converter. In addition, a processor is provided for digital color processing of the plural continuous digital color component signals to form digital color image signals usable for reproduction of the color image.

11 Claims, 18 Drawing Sheets

COLOR IMAGE READING APPARATUS WITH PLURAL LINEAR SENSORS WHICH CAN READ DIFFERENT LINES OF THE IMAGE

This application is a continuation of application Ser. No. 804,110, filed Dec. 3, 1985, now abandoned.

BACKGROUND OF THE INVENTION

1. Field of the Invention

The present invention relates to a color image reading device for entering color image data into an apparatus for electrically processing image information such as a digital copying machine, a facsimile or an electronic file.

2. Description of the Prior Art

As an example, in a digital color copying machine, a colored original to be copied is color-separated with color filters, and is photoelectrically read for example with a linear sensor having photoelectric converting elements such as photodiodes. The output signals of differenct colors from the linear sensor contain a dark current of the linear sensor. Consequently faithful reproduction of the color original image cannot be expected if a print is made from the output signals of the linear sensor.

Color signals required for image printing are generally prepared through a color conversion process on color information obtained by reading a color original with color separation.

The form of signals can be roughly classified as analog signals and digital signals. In comparison with an analog signal, a digital signal has certain advantages such as being less susceptible to the influence of noise, but involves certain specific drawbacks such as digitizing error missing bit. Thus, if the color information obtained by color separation of an original is processed and subjected to color conversion in a digital manner, a satisfactory color balance may not be maintained since the above-mentioned drawbacks of the digital signals may hinder exact color conversion.

Also the accuracy of the color signals may suffer a phase matching thereof conducted in the above-mentioned color converting process.

For the purpose of photoelectrically reading the density of a color original image, there is already known a linear sensor consisting of a linear array of plural photosensor elements. In the case of reading a black-and-white original image with a resolving power of 16 pixels/mm on the shorter side (ca. 210 mm) there will be required a linear sensor with ca. 3,500 photosensor elements. It is however extremely difficult to prepare so many photosensor elements, without defects and with a substantially uniform sensitivity, on the same substrate, so that such linear sensor is impractical in terms of cost, unless a significant improvement is made for example in the production yield. Also for reading a color image there are required tripled photosensor elements which further reduce the practicality of such sensor.

It has therefore been considered to arrange plural linear sensors along the scanning direction to read the image of a line using the plural linear sensors. Such structure, allowing reduction in the number of photosensor elements to be prepared on a substrate, improves the production yield and is capable of resolving the above-mentioned cost problem to a certain extent.

On the other hand, a color image reading provides image information about three times larger than a monochrome image reading, since the color image has to be separated into plural elementary colors, for example three colors. A high-speed processing of such color image information requires high-speed devices in the components constituting the processing circuit, thus leading to a high cost. Also the image reading speed is limited by the processing speed of such components.

Color image reading with a linear sensor can be achieved either by moving the optical image with respect to a fixed linear sensor or by moving the linear sensor with respect to a fixed original image, but the latter is preferred in consideration of the miniaturization of the apparatus or ease of control.

In such case, in order to transmit the color signals from the moving linear sensor to a processing unit in the apparatus, there is required a signal line of a length at least equal to the moving distance of the sensor. However such apparatus is usually provided with various noise-generating components such as a sensor-driving motor or a high-voltage transformer which may affect and disturb the color signals transmitted in said signal line. Thus exact color conversion cannot be expected and satisfactory copying of a color image cannot be achieved.

SUMMARY OF THE INVENTION

In consideration of the foregoing, an object of the present invention is to provide a color image reading device adapted for entering color image data into an apparatus for electrically handling image information such as a digital copying machine, a facsimile or an electronic file.

Another object of the present invention is to provide a color image reading device capable of high-speed color image reading with a high resolving power.

Still another object of the present invention is to provide a color image reading device capable of precise color conversion in color image reading.

Still another object of the present invention is to provide a color image reading device capable of achieving satisfactory image processing without the influence of external noises, with a compact size and a simple control.

Still another object of the present invention is to provide a color image reading device capable of providing satisfactory color signals by eliminating signals of an unstable level such as a dark current contained in the color signals from a linear sensor.

The foregoing and still other objects of the present invention, and the advantages thereof, will become fully apparent from the following description.

DETAILED DESCRIPTION OF THE PREFERRED EMBODIMENTS

Now the present invention will be clarified in detail by an embodiment thereof shown in the attached drawings.

Figure 1A:
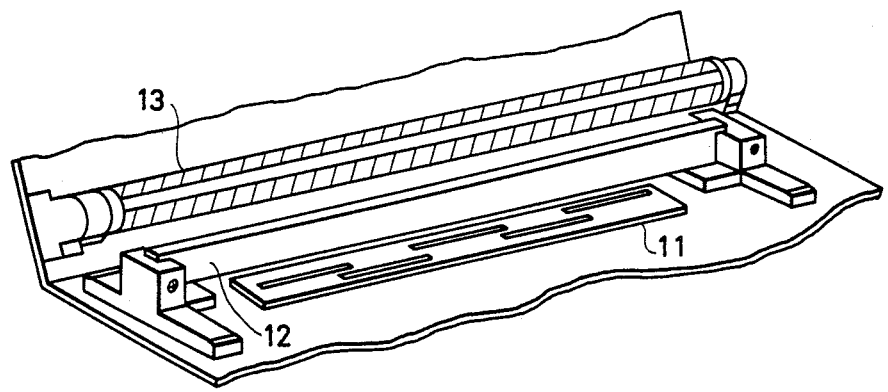
FIGS. 1A and 1B are schematic views showing an example of an image reading unit.
Figure 1B:
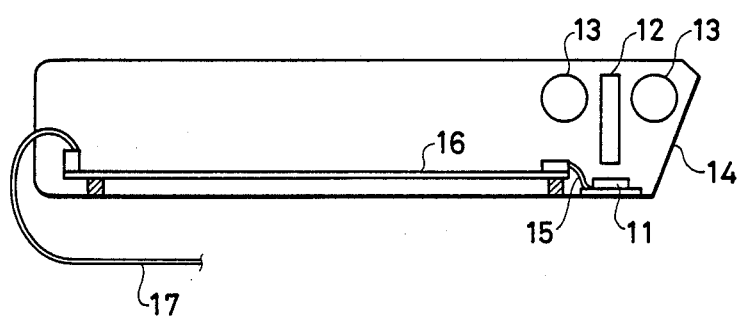

In this embodiment there is employed a contact color sensor for reading an original image. FIGS. 1A and 1B show the structure of an image reading unit employing such contact color sensor. As shown in FIG. 1A, there is formed an integral structure by a sensor unit 11 provided with plural CCD chips, a converging rod lens array 12 positioned on sensor unit 11, and a linear light source 13 positioned close to the lateral face of rod lens array 12. Though only one light source is shown in FIG. 1A, there are in fact provided two light sources so as to sandwich the rod lens array 12. In this structure, the converging rod lens array 12 focuses the light, reflected from the original illuminated by the light source 13, onto the plural CCD chips in 1:1 ratio, without any size reduction.

As shown in FIG. 1B, the sensor unit 11, rod lens array 12 and light sources 13 are mounted on a carriage 14 together with a signal processing board 16 and a flexible cable 15 connecting the board with the sensor unit 11, and a flexible cable 17 is employed for connecting carriage 14 with the main body.

Thus the optical image focused on the CCD chips of the sensor unit 11 is converted, through the photoelectric converting function of the CCD's, into charges.

Figure 2:
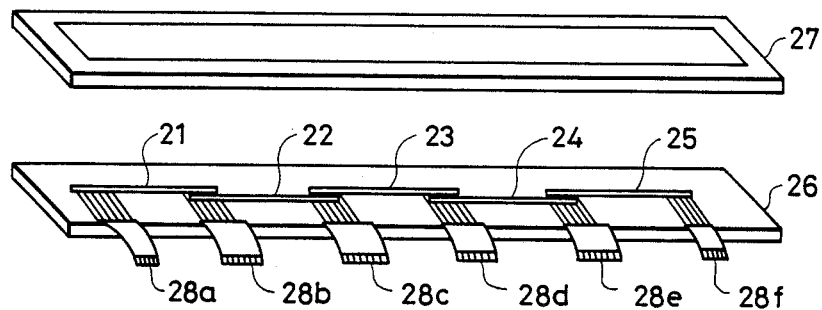
FIG. 2 is a perspective view showing an example of a color CCD sensor unit.
Figure 4:
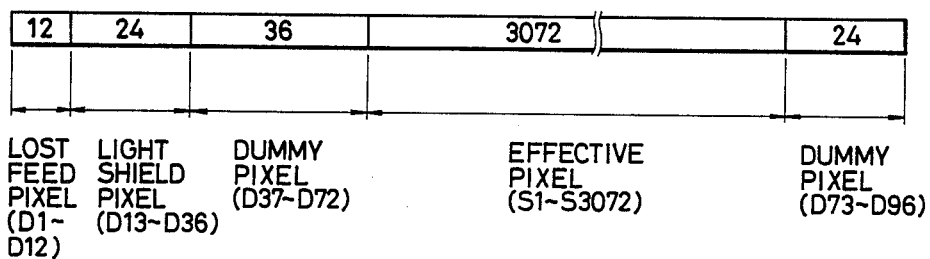
FIG. 4 is a schematic view showing areas of a CCD chip.

The structure will now be explained in further detail. As shown in FIG. 2, the contact type color CCD sensor unit 11 is composed of five CCD chips 21–25 arranged in staggered fashion on a ceramic substrate 26, a cover 27 for substrate 26 and connecting flexible cables 28a–28f. In the CCD chips 21–25, each photosensor element is composed of a p-n photodiode of a size of 62.5×15.5 μm. Each CCD chip is provided, as shown in FIG. 4, with photosensor elements of 3,168 bits, including 12 bits of empty pixels D1–D12 unconnected with photosensitive elements, 24 bits of light-shielded pixels D13–D36 provided with an aluminum shield, 36 bits of dummy pixels D37–D72, 3,072 bits of effective pixels S1–S3072, and 24 bitsof rear dummy pixels D73–D96.

Figure 3:
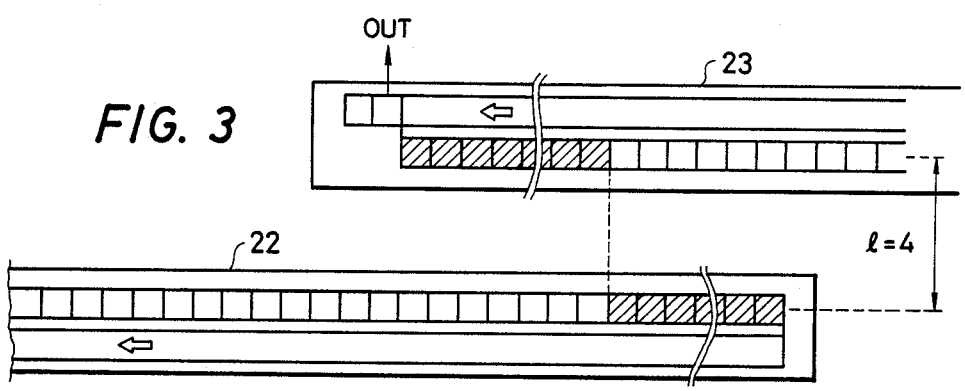
FIG. 3 is a schematic view showing the arrangement of neighboring CCD chips.

As shown in FIG. 2, the above explained CCD chips 21–25 are arranged in two lines in staggered fashion. As shown in FIG. 3, immediately neighboring CCD chips, for example the CCD chips 22 and 23, are spaced in the sub scanning direction by a distance l, measured between the centers of the photosensor elements. In the present embodiment distance l is selected equal to the size of four pixels. Also CCD chips 21–25 are mutually overlapping in the direction of arrangement of main scanning.

As explained before, the photosenor elements in each of the CCD chips 21–25 include, from left to right, an empty area D1–D12, a light-shielded area D13–D36, a dummy area D37–D72, an effective pixel area S1–S3072 and a rear dummy area D73–D96, and said overlapping is allowed in areas other than said effective pixel area of 3072 bits. Thus the effective reading width is equal to 320 mm which is slightly longer than the shorter side 297 mm of the A3 size.

On the photodiodes of the CCD chips 21–25 there should be provided color filters for obtaining color signals. Such color filters can be adhered onto the silicon constituting the photodiodes, or can be formed directly on the silicon. In the former method the color filters can be prepared on a glass substrate but there is involved an additional step of adhesion which tends to result in an error in registration. It is considerably difficult to reduce the error of adhesion to several microns or less, and the error may deteriorate color reproduction and result in a shading phenomenon. On the other hand, the latter method can significantly improve the precision of registration because of a simpler process, as the color filters can be simply prepared in registration with the pixels on silicon. The latter method is therefore employed in the present embodiment.

Figure 5:
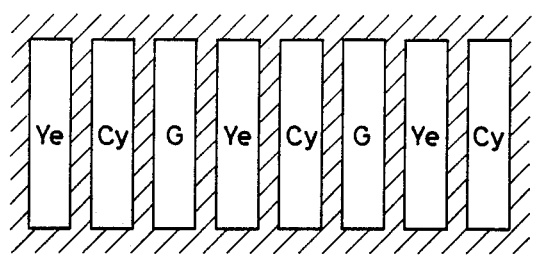
FIG. 5 is a plan view showing color filters provided on the CCD chip.

The arrangement of filters will now be explained. In the present embodiment, as shown in FIG. 5, filters of yellow (Ye), green (G) and cyan (Cy) are repeatedly arranged in this order, and neighboring three bits constitute a pixel in image reading. The area outside the filters is shielded with aluminum.

Figure 6:
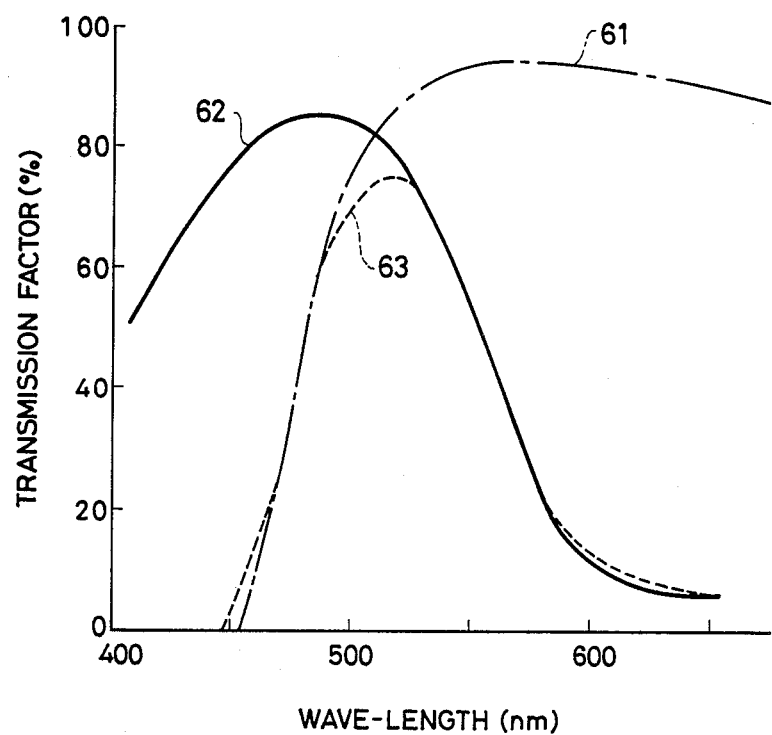
FIG. 6 is a chart showing spectral characteristics of color filters.

FIG. 6 shows the spectral characteristics of the filters of these colors. As can be seen from FIG. 6, the transmittance of the yellow filter, represented by a curve 61, rapidly increases from about 500 nm. The transmittance of the cyan filter, represented by a curve 62, shows a peak at about 500 nm. The green filter, obtained by superposing the cyan and yellow filters in the present embodiment, shows a peak in transmittance at about 500 nm as represented by a curve 63. An important point in the spectral characteristics of these filters is that the transmittance is not zero at a wavelength of about 700 nm which is outside the visible range of humans.

Figure 7:
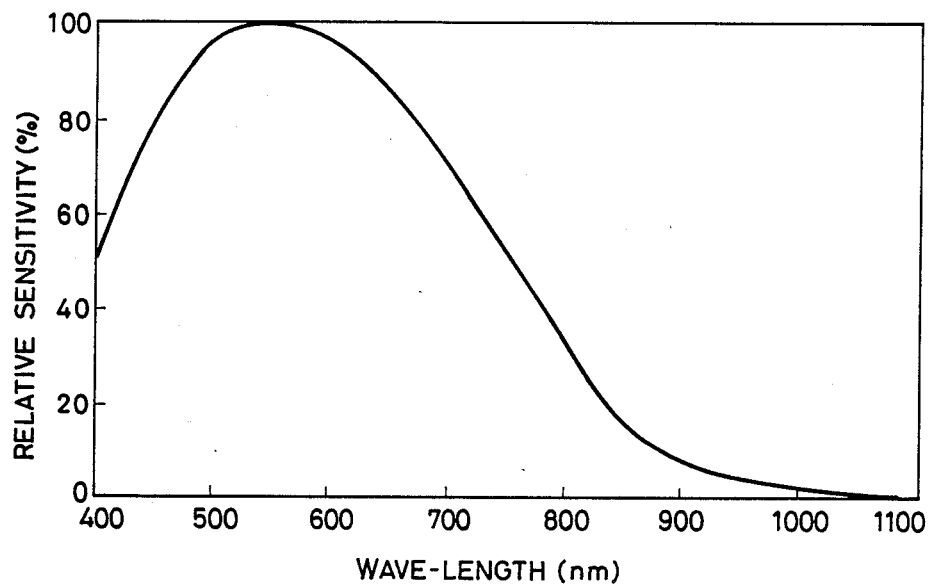
FIG. 7 is a chart showing spectral sensitivity of a photosensor element.

For achieving faithful color reproduction, the combination of the color filters and the CCD chips 21–25 has to perform a function similar to that of the human eye. As shown in FIG. 7, the spectral sensitivity of the photosensor elements of the CCD chips 21–25 shows a peak at about 550 nm and extends effectively beyond 1000 nm.

Thus, the photosensor elements of the CCD chips, equipped with the color filters of the present embodiment, can respond to the light of a wavelength beyond 700 nm. On the other hand, the sensitivity of the human eye is zero to a wavelength beyond 700 nm. Consequently the mere combination of the CCD chips and the color filters of cyan, green and yellow is unable to achieve a same function as that of the human eye. For this reason, a specified light source is employed in the present embodiment as will be explained later.

Figure 8:
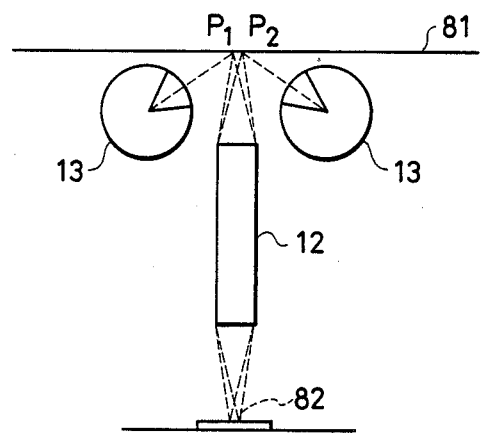
FIG. 8 is a schematic view showing the structure of a part of the image reading unit.

In the following there will be given an explanation on the converging rod lens array. As shown in FIG. 8, in the rod lens array 12 employed in the present embodiment, an original plane 81 is placed at the focal point at the entrance side, and the CCD chips 82 in two lines are located at the focal point at the exit side. In this manner the original plane 82 and the CCD chips 82 are in an imaging relationship. Thus an image on the original plane 81 is focused, as an erect image of same size, onto the CCD chips 82. However, since only one rod lens array 21 is employed in combination with the CCD chips of the aforementioned staggered arrangement, the neighboring CCD chips receive images which are distanced by four lines on the original plane 81. In order to obtain image signals of a continuous line, therefore, an exclusive memory is employed in the present embodiment as will be explained later.

As regards the light source 13, there are employed fluorescent lamps in the present embodiment. As explained before, the contact type sensor for color image reading is required to perform a color sensitivity the same as that of the human eye.

Figure 9:
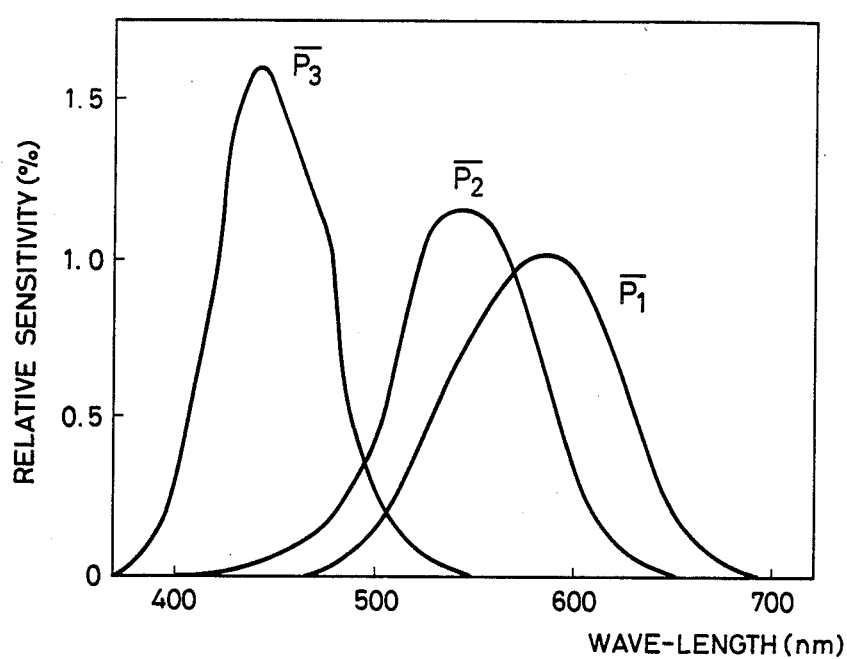
FIG. 9 is a chart showing Thomson-Wright basic curves.

FIG. 9 shows a Thomson-Wright basic curve, which shows the spectral sensitivity of the human eye, i.e. the relationship between the wavelength of light and the relative sensitivity to a colored light. As will be apparent from curves $\overline{P1}$, $\overline{P2}$ and $\overline{P3}$, the human eye is insensitive to the light of a long wavelength beyond 700 nm.

On the other hand, the combination of the CCD chips 21–25 and the color filters is still sensitive to the light of a wavelength beyond 700 nm, so that such combination responds to the light of a wavelength beyond 700 nm when illuminated with white light.

Figure 10:
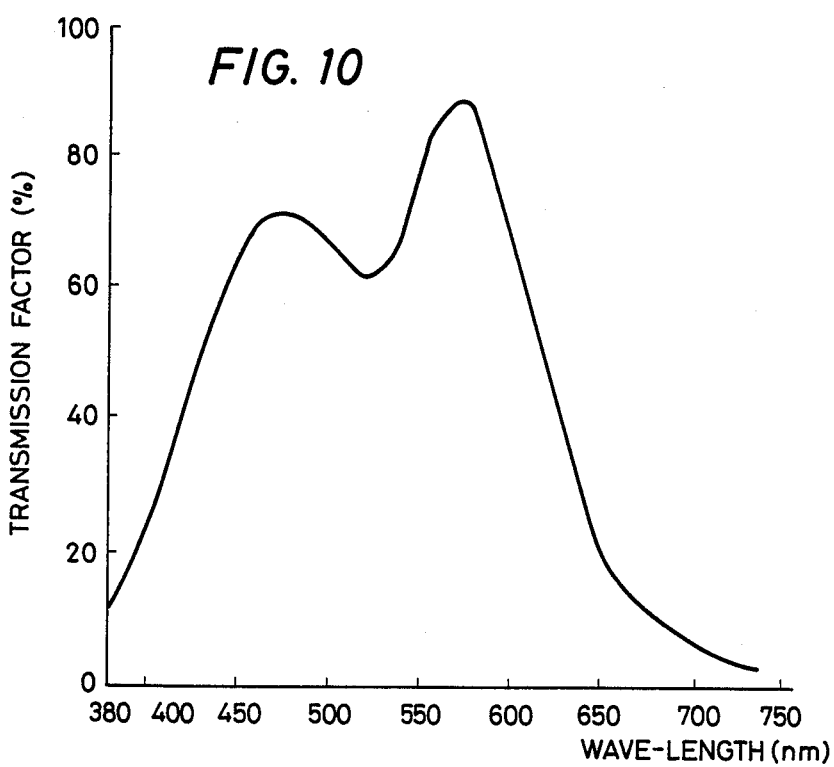
FIG. 10 is a chart showing spectral characteristic of a fluorescent lamp.
Figure 11:
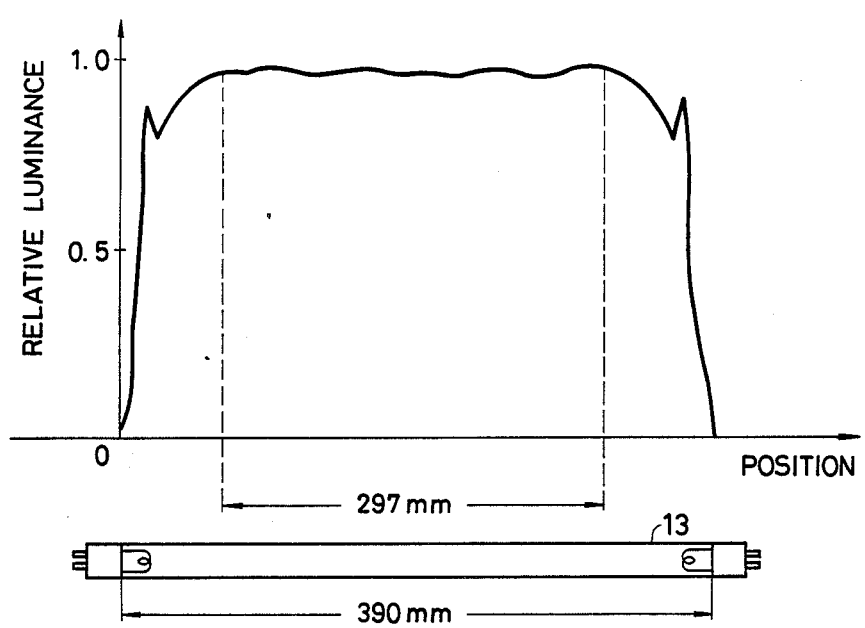
FIG. 11 is a chart showing a relative luminance distribution of a fluorescent lamp.
Figure 14:
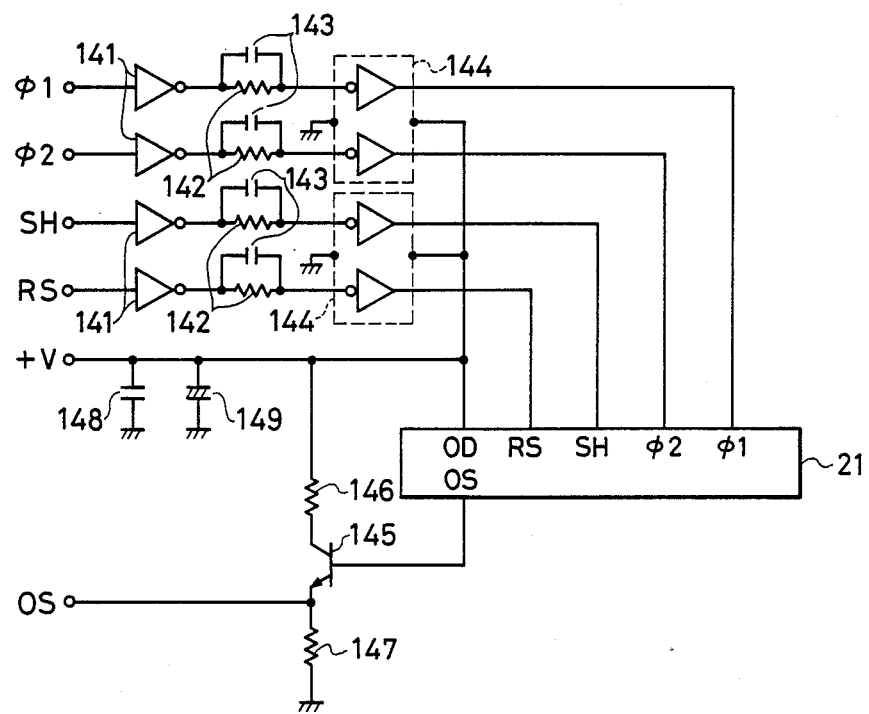
FIG. 14 is a circuit diagram showing an image sensor driving circuit.

Consequently, in the present embodiment, there are employed fluorescent lamps having little spectral distribution over 700 nm, as shown in FIG. 10. Although the fluorescent lamp is a linear light source, the luminance is not longitudinally uniform because of the influence of filaments which are present. Therefore, in order to obtain uniform luminance over the shorter side of A3 size, the length of tube is selected longer, for example 390 mm as shown in FIG. 11, thus achieving longitudinal uniformity of illumination within ±5% within the shorter side (297 mm) of A3 size. Also for increasing the intensity of illumination, the fluorescent lamp is provided therein with a reflecting layer and with an aperture of 30°.

Figure 12:
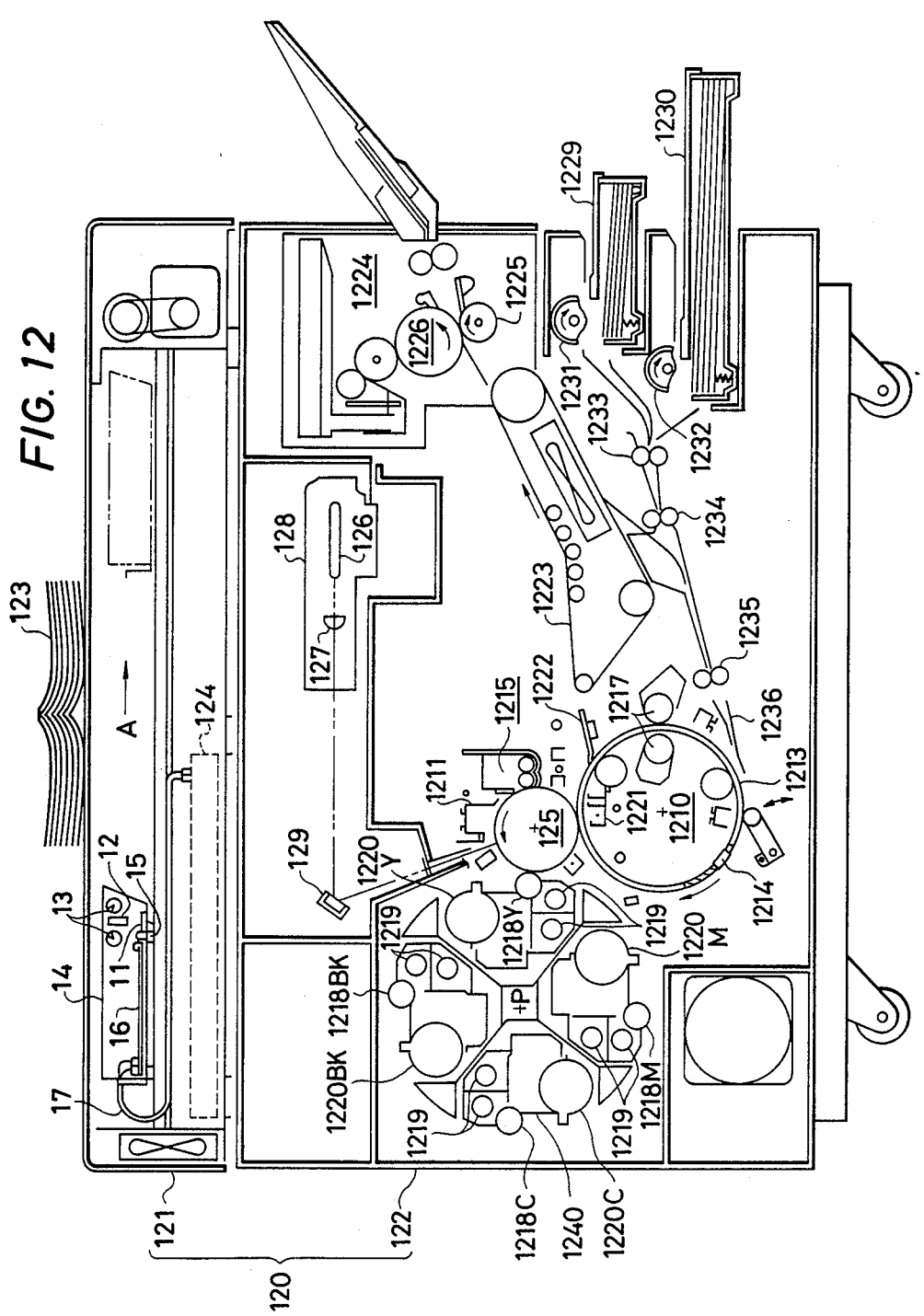
FIG. 12 is a cross-sectional view showing an example of a color digital copying machine.

FIG. 12 is a cross-sectional view of a color digital copying machine 120 employing the above-mentioned contact type color CCD sensor, said copying machine consisting of a color image reading apparatus 121 and a color image printing apparatus 122. An original scanning unit 14, shown in FIG. 1, is moved in a direction A to achieve a sub scanning, thereby reading the image of an original 123 placed on an original support table. During movement of the original scanning unit 14, the lamps 13 are lighted and the light reflected from the original is focused onto the CCD chips of the aforementioned contact color CCD sensor unit 11 through the rod lens array 12.

CCD sensor unit 11 is provided with five CCD chips arranged in staggered fashion, each having 1024 pixels or 3072 bits, wherein each pixel of 62.5 μm (1/16 mm)×15.5 μm is divided into three areas respectively having cyan, green and yellow filters.

The following explains an electric circuit relating to the function of the color CCD sensor unit 11. The electric circuit is composed of an image sensor driving circuit for driving the CCD's, an analog process unit consisting of an analog process circuit for converting the output signals of the CCD's into a form suitable for image information, and a digital process circuit for converting the signals from the analog process unit into signals suitable for recording. The analog process circuit and the digital process circuit are collectively called a sensor signal process unit.

In the following there will be given an explanation of the image sensor driving circuit, taking an example of the circuit for the CCD chip 21. The driving circuit deals with two-phase clock signals $\phi 1$, $\phi 2$ for driving the CCD chip 21, a scanning synchronization signal SH, a reset signal RS and an output signal OS of the CCD 21.

An input terminal for the clock signal $\phi 1$ is connected to an inverter 141, of which output is connected, through a resistor 142 and a parallel speed-up capacitor 143, to the input terminal of a MOS clock driver 144. The output terminal thereof is connected to a port $\phi 1$ of the CCD chip 21. A similar circuit is provided for the clock signal $\phi 2$. Also inverters 141, resistors 142, capacitors 143, MOS clock drivers 144 are similarly connected to the terminals for the scanning synchronization signal SH and the reset signal RS.

A terminal for the output signal OS is connected to an emitter follower circuit consisting of an npn transistor 145, a collector resistor 146 and an emitter resistor 147. A power supply voltage +V for the CCD chip 21 is supplied, through a circuit consisting of capacitors 148, 149, to a port OD of the CCD chip 21.

The two-phase clock signals $\phi 1$ and $\phi 2$ are required for bit-serially transferring the charges generated in the bits of the CCD chip 21.

The scanning synchronization signal SH is used for punctuating a scanning period in the transfer of the charges from the CCD chip 21, and the reset signal RS is used for erasing the remaining charges in the bits after the transfer of charges from the pixels. The output signals OS are released from the CCD chip 21 in synchronization with the two-phase clock signals $\phi 1$, $\phi 2$. As shown in FIG. 4, the output signals OS per chip include effective signals of 3072 bits, dummy signals, empty signals, and reference black level signals obtained from light-shielded pixels. These signals have exactly defined bit positions, and the reference black level signal indicates the dark level of the photosensor elements and is utilized for obtaining true output signals corresponding to the colors.

Figure 13:
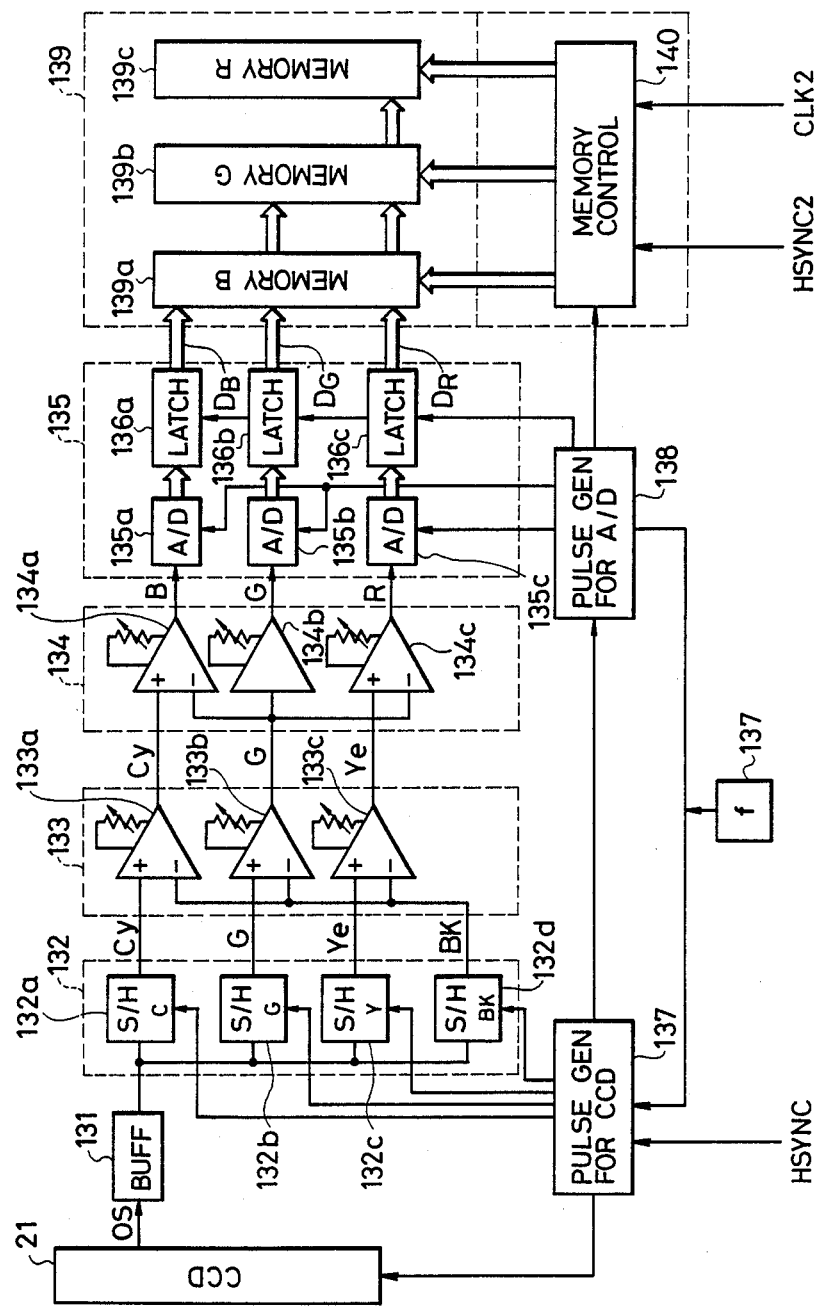
FIG. 13 is a block diagram of a sensor signal processing unit.

FIG. 13 shows the sensor signal process unit, provided for each of the CCD chips 21–25. In the following the unit for the CCD chip 21 is taken as an example.

As shown in FIG. 13, the analog output signals OS from the CCD chip 21 are supplied, through a buffer circuit 131, to multiplexers 132 for separating the signals into cyan Cy, green G, yellow Ye and black BK signals.

Then a dark level eliminating unit 133 subtracts the reference black level signal BK, obtained from the multiplexer 132d, from output signals of different colors Cy, G, Ye obtained from the multiplexers 132a, 132b, 132c to obtain true output signals corresponding to the incoming light and free from the black level signal, which are then amplified into voltages for supply to a succeeding color converting unit 134.

The color converting unit 134 prepares elementary color signals of blue B, green G and red R from the aforementioned output singals Cy, G, Ye from the dark level eliminating unit 133, and amplifies the elementary color signals R, G, B to a suitable input signal level for an A/D conversion unit 135, which converts the analog signals from the color conversion unit 134 into digital signals and stores the same in a memory unit 139.

The multiplexer 132 consists of four sample hold (S/H) circuits 132a–132d for separating the output signals from the buffer circuit 132 into color signals of different colors. The dark level eliminating unit 133 consists of three differential amplifiers 133a–133c. The color conversion unit 134 consists of three differential amplifiers 134a–134c for converting the signals Cy, G, Ye into the signals B, G, R, taking the signal G as reference. The A/D conversion unit 135 consists of three A/D converters 135a–135c for converting amplified color signals into digital signals, and three latch circuits 136a–134c for latching the digital output signals. In the present embodiment, the analog process circuits up to the A/D converters 135a–135c are mounted, together with the color CCD sensor unit 11, on the signal process board 16 of the original scanning unit 14, and are connected, through a flexible cable 17, to a main circuit board 124 provided with the latch circuits 136a–136c, memory unit 139 and digital signal process unit to be explained later. Consequently signal transfer from the scanning unit 14 to the main circuit board 124 is effected in digital form less susceptible to the influence of noises, thus ensuring satisfactory image reproduction.

The memory unit 139 is provided with memory areas 139a–139c for different colors B, G and R.

In addition to the above-explained principal structure of the sensor signal process unit provided corresponding to the CCD chip 21, there are provided certain control elements which will be explained in combination with the principle of function.

Figure 15A:
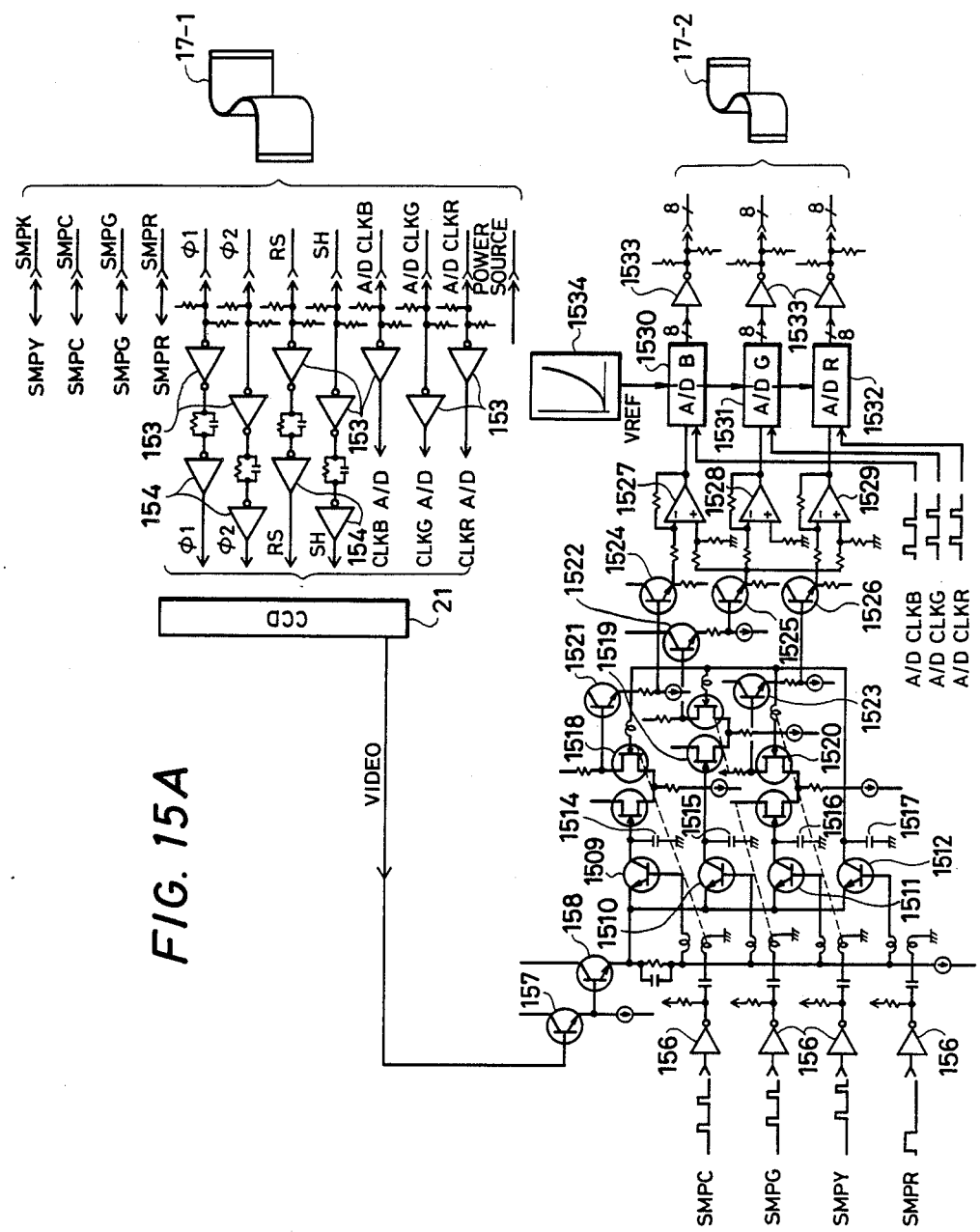
FIG. 15A is a circuit diagram showing an example of a signal processing board.

FIG. 15A shows the detailed circuit structure of the signal process board 16 of the original scanning unit 14. A flexible cable 17-1 supplies plural clock pulses and a power supply voltage for driving the image sensor (CCD's) and the sensor signal process unit, to the original scanning unit 14, constituting a movable part and containing the image sensor, illuminating lamps, analog signal process circuit of the sensor signal process unit, image sensor driving circuit and optical lens system. On the other hand a flexible cable 17-2 supplies digital color signals from the sensor signal process unit to the main body.

There are provided clock buffer receivers 153 for receiving plural clock pulses transmitted through the flexible cable 17-1; image sensor clock drivers 154 for elevating the voltage of the signals from the clock buffer receivers to values suitable for operation of the image sensor; image sensors (CCD's) 21 for reading the original image on the original support glass; sample-hold drivers 156 for driving the sample-hold circuits, for receiving and retaining the time-sequential color pixel signals BK, C, G, Y from the image sensors 21, according to sample pulses SMPC, SMPG, SMPY, SMPK respectively corresponding to said colors; a buffer transistor 157 for receiving the time-sequential color pixel signals of BK, C, G, Y supplied from the image sensors 21; and a demultiplexer-buffer transistor 158 for transmitting the time-sequential color pixel signals of BK, C, G, Y from the buffer transistor 157 to the sample-hold circuits of different colors.

There are further provided transistor switches 1509–1512 for separating and respectively retaining the time-sequential color pixel signals of cyan (C), green (G), yellow (Y) and black (BK) released from the image sensors 21; a C-hold capacitor 1514, a G-hold capacitor 1515, a Y-hold capacitor 1516 and a BK-hold capacitor 1517 for retaining the output voltages of transistor switches 1509–1512 as a cyan signal voltage $V_C'$, a green signal voltage $V_G'$, a yellow signal voltage $V_Y'$ and a black level signal voltage $V_{BK}'$; high-input differential FET's 1518–1520 for eliminating the component $V_{BK}$ from signals $V_C'$, $V_G'$ and $V_Y'$ and amplifying the signals; level shifter transistors 1521–1523 for eliminating a DC component from the color pixel signals $\alpha V_C$, $\beta V_G$, $\gamma V_Y$ obtained by the elimination of the component $V_{BK}$ and amplification of $\alpha$, $\beta$ and $\gamma$ times in high-input differential FET's 1518–1520; and emitter follower transistors 1524–1526 for converting the output signals of said level shifter transistors 1521–1523 into low output resistances.

There are further provided a B-differential amplifier-buffer 1527 for obtaining the difference of the output signals of the C-emitter follower transistor 1524 and the G-emitter follower transistor 1525 and amplifying the difference by 1/H times to obtain a color difference signal $1/H \cdot V_B$; a G-differential amplifier-buffer 1528 for amplifying the output signal of the G-emitter follower transistor 1525 by 1/J times to obtain a signal $1/J \cdot V_G$; an R-differential amplifier-buffer 1529 for obtaining the difference of the output signals of the G-emitter follower transistor 1525 and the Y-emitter follower transistor 1526 and amplifying the difference by 1/I times to obtain a color difference signal $1/I \cdot V_R$; a B-A/D converter 1530 for converting the analog pixel signals from the B-differential amplifier buffer 1527 into digital pixel signals according to A/D clock pulses B; a G-A/D converter 1531 for converting the analog pixel signals from the G-differential amplifier buffer 1528 into digital pixel signals according to A/D clock pulses G; and an R-A/D converter 1532 for converting the analog pixel signals from the R-differential amplifier buffer 1529 into digital pixel signals according to A/D clock pulses R.

There are further provided line drivers 1533 for transferring the digital pixel signals of different colors to the main body through the flexible cable 17-2, in response to digital pixel signals of blue, green and red received from said A/D converters 1530–1532; and a voltage reference 1534 for providing said A/D converters 1530–1532 with a reference voltage for digital conversion.

The image sensor driving circuit and the sensor signal process until will now be explained, while making reference to FIGS. 15A and 15B. The sensor unit 11 of the present embodiment is provided, as explained before, with five CCD chips 21-25, each of which is independently provided with the following circuits for parallel function. It is therefore rendered possible to reduce the time required for processing the image of a line, and a very high speed is not required in the devices such as A/D converters.

Figure 15B:
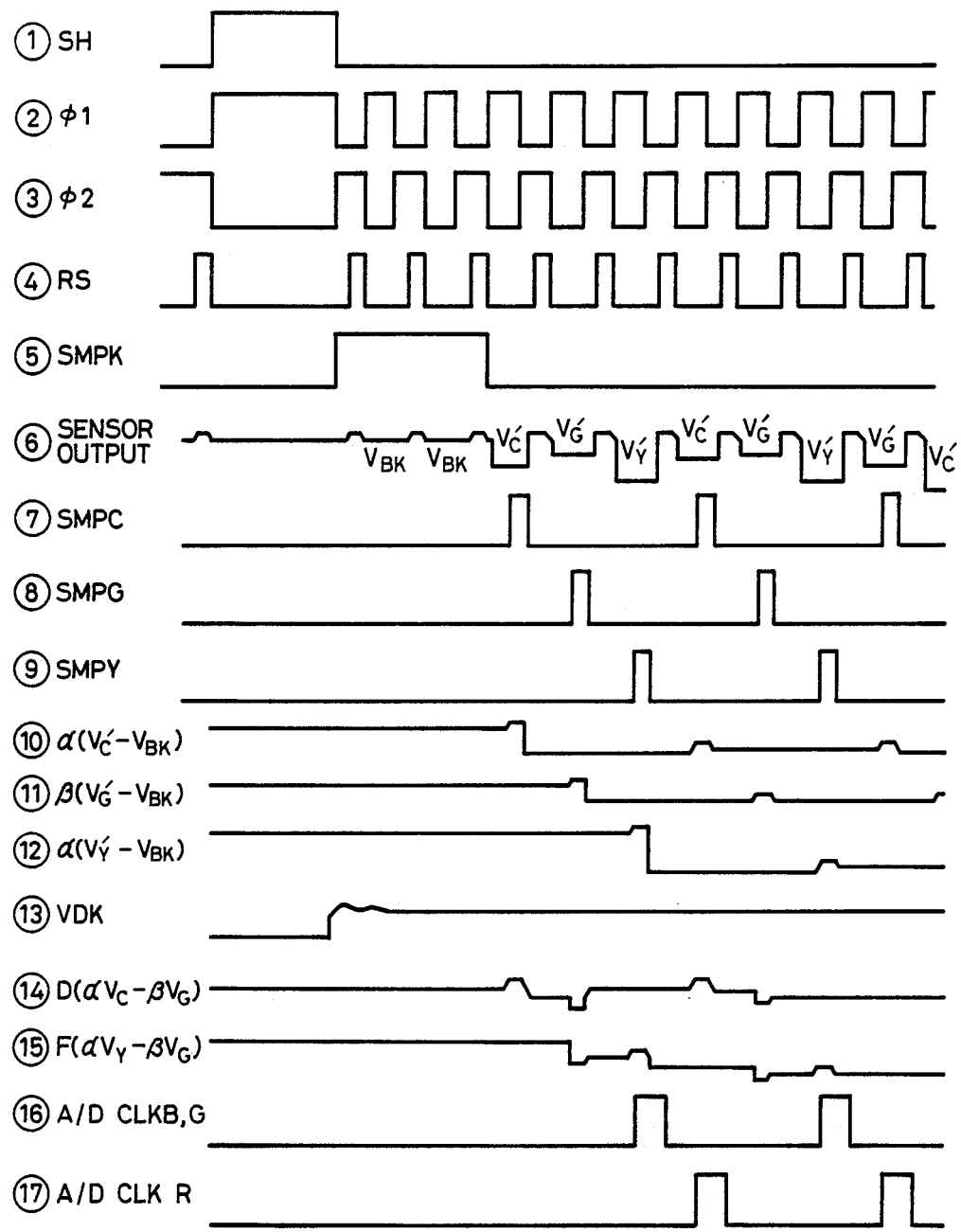
FIG. 15B is a timing chart showing the functions of various parts of the circuit shown in FIG. 15A.

For driving the image sensor 21 there are required (1) SH pulses, (2) φ1 pulses, (3) φ2 pulses and (4) RS pulses shown in FIG. 15B. These driving pulses, of the functions explained before, require a higher voltage level, because of the nature of the image sensor, in comparison with the voltage of the pulses in the main body. Consequently the driving pulses, generated by a CCD pulse generator 137 provided in the main body, are supplied through the flexible cable 17-1, then subjected to wave forming by the clock buffer receivers 153, then elevated to the aforementioned high voltages in the image sensor clock drivers 154 and supplied to the image sensors 21–25.

In response to the pulse voltages, the image sensors 21–25 release the color-separated signals $V_C'$, $V_G'$ and $V_Y'$ of cyan, green and yellow corresponding to incident light and the aforementioned light-shielded pixel signal $V_{BK}$ in time-sequential manner as represented by a curve (6) in FIG. 15B.

More specifically the image sensor driven by the above-mentioned image sensor driving circuit releases the pixel signal voltages in the order of $V_{BK}$, $V_C'$, $V_G'$, $V_Y'$, $V_C'$, $V_G'$, $V_Y'$, ..., and these analog pixel signals require certain analog signal processings and digitization before they are supplied to the digital data process unit of the main apparatus. One of such analog signal processings is color conversion, in which the color pixel signals of cyan, green and yellow released by the image sensors are subjected, pixel by pixel, to a calculation of conversion into blue, green and red signals. Such conversion is required because the image sensor can provide a higher contrast in case of releasing the cyan, green and yellow signals than in the case directly releasing the blue, green and red signals, and because the digital color image process unit can be simplified when it receives the blue, green and red signals. Another analog signal processing removes a floating voltage component, uniformly contained in the color-separated signals of cyan, green and yellow released from the image sensor. This floating voltage component, hereinafter called $V_{BK}'$ is caused by a variation in the dark potential of the photodiodes in the image sensor or in the charges in the CCD channels and is present at a same level in the output voltages $V_C'$, $V_G'$ and $V_Y'$ of the image sensors. Floating voltage component $V_{BK}$ is therefore removed prior to color conversion, to obtain pure color signal voltage components. Still another analog signal processing is for converting the time-sequential signals into parallel signals for achieving the above-mentioned color conversion, or, more specifically, for conducting subtraction $V_C - V_G$ or $V_Y - V_G$.

The color conversion in the sensor signal process unit, will now be explained in reference to FIGS. 15A and 15B. In consideration of the presence of the aforementioned floating voltage component $V_{BK}$ in the time-sequential color signals released from the image sensors, the signals are represented as $V_C' = (V_C + V_{BK})$, $V_G' = (V_G + V_{BK})$, $V_Y' = (V_Y + V_{BK})$. The time-sequential color signals and the floating voltage component $V_C'$, $V_G'$, $V_Y'$ and $V_{BK}$ supplied to the base of the buffer transistor 157 are further transmitted to the demultiplexer-buffer transistor 158, whose emitter is connected to the transistor switches 1509–1512 of different colors in an inverse bias state. In the absence of a sample pulse from the sample-hold driver transistors 156, a high resistance merges between the emitter and collector of the corresponding transistor switches, whereby the sample-hold capacitors 1514–1517 and the high-input differential FET's 1518–1520 connected to the collectors are separated from the emitter of the demultiplexer-buffer transistor 158, thus achieving a signal-holding operation.

The sampling pulses SMPK, SMPC, SMPG, SMPY of black, cyan, green and yellow, supplied from the main apparatus through the flexible cable 17-1, as shown by curves (5), (7), (8) and (9) in FIG. 15B, are supplied to the sample-hold driver transistors 156 at the illustrated suitable timings. The transistor switches 1509–1512 assume a low-resistance state in the order of the sampling pulses, whereby the time-sequential emitter voltages $V_{BK}$, $V_C'$, $V_G'$, $V_Y'$ ... of the transistor 158 are transferred to the sample-hold capacitors in the order of 1517, 1514, 1515, 1516. In this manner the time-sequential color signal voltages and the floating component voltage are separated into parallel voltages $V_{BK}$, $V_C'$, $V_G'$ and $V_Y'$. When each sampling sampling pulse is over, each of the transistor switches 1509–1512 immediately returns to the original high-resistance state, whereby voltages $V_{BK}$, $V_C'$, $V_G'$ and $V_Y'$ are retained in respective sample-hold capacitors 1514–1517.

Three high-input differential FET's 1518–1520, of which either input terminals are respectively connected to sample-hold capacitors 1514–1516 and the other input terminals are connected to the capacitor 1517 for retaining the floating voltage component, provide the following drain output voltages, according to the characteristic of the differential amplifiers:

Output of FET 1518:

$$\alpha(V_C' - V_{BK}) = \alpha(V_C + V_{DK} - V_{DK}) = \alpha V_C \quad (1)$$

Output of FET 1519:

$$\beta(V_G' - V_{DK}) = \beta(V_G + V_{DK} - D_{DK}) = \beta V_G \quad (2)$$

Output of FET 1520:

$$\gamma(V_Y' - V_{DK}) = \gamma(V_Y + V_{DK} - V_{DK}) = \gamma V_Y \quad (3)$$

wherein $\alpha$, $\beta$ and $\gamma$ are respective voltage gains of the FET circuits.

As represented by the equations (1), (2) and (3), the FET's provide color pixel signals $\alpha V_C$, $\beta V_G$ and $\gamma V_Y$ free from the floating voltage component $V_{DK}$ and amplified by determined gains, as represented by curves (10), (11) and (12) shown in FIG. 15B.

The gains $\alpha$, $\beta$ and $\gamma$ are used as matrix constants for color conversion, in which the following calculations are effected for preparing blue signal $V_B$ and red signal $V_R$ from the cyan, green and yellow signals:

$$HV_B = \alpha V_C - \beta V_G, \text{ wherein H is constant} \quad (4)$$

$$JV_G = \beta V_G, \text{ wherein J is a constant} \quad (5)$$

$$IV_R = \gamma V_Y - \beta V_G, \text{ wherein I is a constant} \quad (6)$$

The outputs of the high-input differential FET's 1518–1520 are supplied to the level shifter transistors 1521–1523 for parallel removal of a DC offset voltage superposed with the color pixel signals $\alpha V_C$, $\beta V_G$ and $\gamma V_Y$, are then supplied to the emitter follower transistors 1524–1526 for low resistance drive, and are supplied differential amplifier-buffers 1527–1529 for detecting color differences.

The differential amplifier-buffer 1527 effects the operation of the equation (4) on the input signals $\alpha V_C$ and $\beta V_G$ through the function as a differential amplifier and eliminates the constant H of the equation (4) by amplification to obtain a pure color conversion output signal $V_B$, as represented by a curve (14) in FIG. 15B. Also the differential amplifier-buffer 1529 effects an operation of the equation (6) on the input signals $\gamma V_Y$ and $\beta V_G$ and eliminates the constant I by amplification to obtain a pure color conversion output signal $V_R$ represented by a curve (15) in FIG. 15B. On the other hand, the differential amplifier buffer 1528 functions as an ordinary amplifier buffer to eliminate the constant J in the equation (5) by amplification of the color signal $\beta V_G$, thus producing a color signal $V_G$ which is 1:1 in ratio signals $V_B$ and $V_R$. The functions of differential amplifier buffers 1527–1529 need not be carried out simultaneously but can be applied to the color signals involving phase differences of the preceding stage.

The color pixel signals $V_B$, $V_G$ and $V_R$ thus obtained are supplied to the A/D converters 1530–1532 for analog-to-digital conversion in response to A/D converting clock pulses A/D CLK B, G, R supplied from the A/D pulse generator of the main apparatus, and then supplied, through the line buffer 1533 and the flexible cable 17-2 to the digital color process unit of the main apparatus.

The A/D converters 1530–1532 perform an A/D conversion according to the following function, in consideration of a gamma-correction for image signals:

$$D = -\log R$$

wherein D is reflective optical density, and R is reflectance. For this converting operation, the A/D converters 1530–1532 externally receive a reference voltage for digitization, and, for this purpose, there is employed a non-linear voltage 1534 approximated by plural linear portions.

The analog color pixel signals $V_B$, $V_G$, $V_R$ representing reflectance and subjected to the above-mentioned logarithmic A/D conversion and polarity inversion in the A/D converters 1530–1532 assume the form of 80 bit digital signals $D_R$, $D_G$ and $D_B$ for transmission to the main apparatus. In this manner the A/D converters 1530–1532 effects a gamma correction as well as A/D conversion on the input analog color signals.

Figure 24:
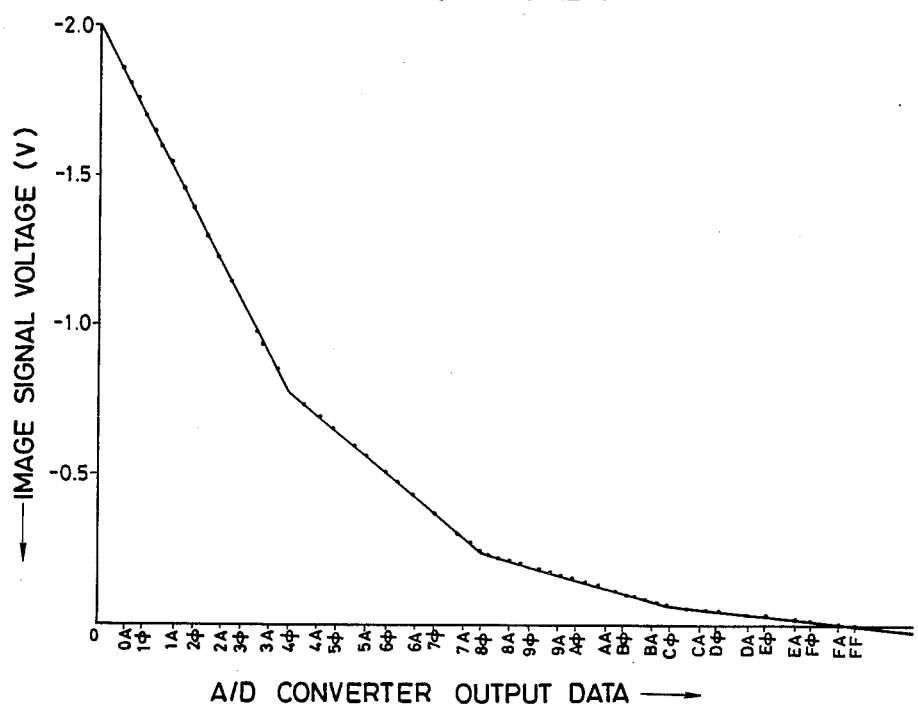
FIG. 24 is a chart showing the characteristic of A/D conversion.

FIG. 24 shows the input-output characteristic of A/D converters 1530–1532, which have four linear portions mutually connected to approximate a logarithmic function. The input-output characteristic is selected in consideration of the properties of the sensors involving color filters and of the printer.

Digital density signals $D_B$, $D_G$, $D_R$ of 8 bits or 256 levels obtained from the A/D converters 1530–1532 are then subjected to a phase matching in latch circuits 136a, 136c (FIG. 13) driven by latch clock pulses CLK relesed from the A/D pulse generator 138.

Consider the number of the digital signals. In the present embodiment, the signals from the CCD chip 21 are separated in the multiplexer 132 into three colors of one bit each. Consequently the number of signals for each color received by the latch 136 is 166 of the number of signals from the CCD chip 21.

Since the effective image reading area of the CCD chip 21 contains 3072 bits, the output signals of red, green or blue contain ⅓ or 1024 bits.

The above-explained signals are stored, according to clock pulses CLK2, in the memory unit 139 provided with memory areas respectively corresponding to the CCD chips 21–25 and to the red, green and blue colors.

More specifically, corresponding to the CCD chip 21, there are provided memory areas 139a, 139b and 139c respectively for blue, green and red. As will be explained later, the capacity of the memory area varies according to the arrangement of the CCD chips 21–25. As explained before, in the present embodiment, the image is focused through a single rod lens array 12 onto the CCD chips 21–25 arranged in a staggered pattern involving a spatial distance of 4 lines. Stated differently the images simultaneously received by the CCD chips 21, 23, 25 in the first row and those 22, 24 in the second row are always distanced by four lines. Therefore, the memory unit 139 compensates for the aberration of four lines to obtain continuous signals of a line.

The memory areas 139a–139c are composed of a static random access memory, and the memory capacity for one line is 1024×8 bits since 8 bits are alloted to each pixel. There are therefore provided addresses from 0 to 1023 in 8-bit unit.

In the following there will be given an explanation on the write-in and read-out of information to and from said memory areas 139a–139c, with emphasis on the elimination of superposed signals in the main scanning direction and the signal correction in the sub scanning direction, in relation to the arrangement of the CCD chips 21–25 and the rod lens array 12.

Figure 16:
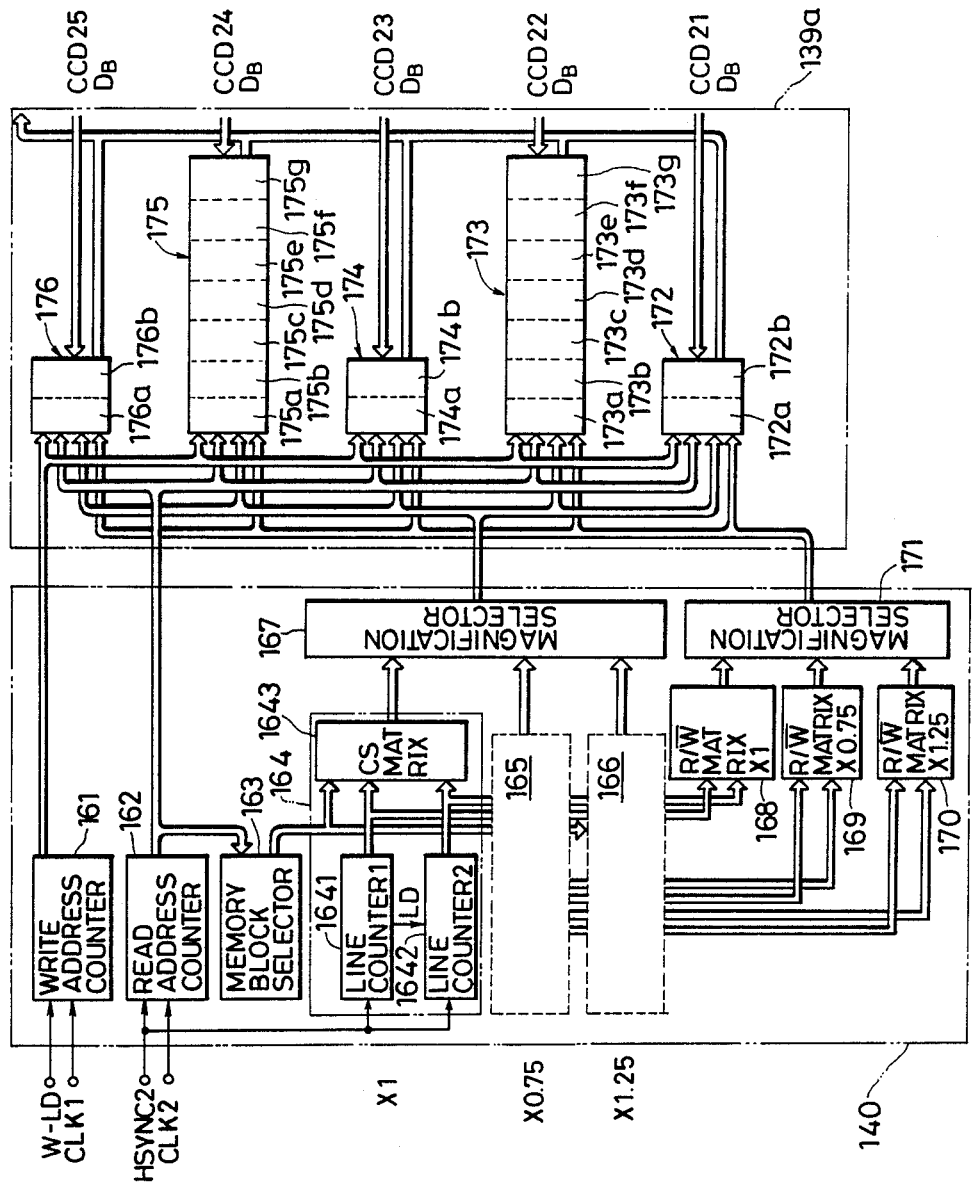
FIG. 16 is a block diagram showing structure of a memory and a memory control unit.

FIG. 16 shows a memory control unit 140 for controlling memory unit 139 and the memory area 139a, corresponding to blue density signals, of memory unit 139. The memory control unit 140 is provided with a write-address counter 161, a read-address counter 162, a memory block selector 163, CS control units 164, 165, 166, magnification selectors 167, 171, and read/write control units 168, 169 and 170.

The memory 139a consists of a memory block 172 corresponding to the CCD 21, a memory block 173 corresponding to the CCD 22, a memory block 174 corresponding to the CCD 23, a memory block 175 corresponding to the CCD 24 and a memory block 176 corresponding to the CCD 25. Each of memory blocks 172–176 is composed of plural small memory blocks each for accumulating the color information of 8×1024 bits of a line.

Now there will be explained the capacity of the memory blocks 172–176 of the memory 139a. As explained already in relation to FIG. 3, the CCD chips 21, 23, 25 are separated from the CCD chips 22, 24 by a spatial distance of four lines. If small memory blocks for two lines are allotted, as a selecting buffer, for each CCD chip, the image signals obtained by serially combining the small memory blocks in the main scanning direction will contain an aberration of four lines between the CCD chips 21, 23, 25 and the CCD chips 22, 24. Consequently, in the present embodiment, the image signals obtained from the CCD chips 22, 24 which precede in image reading are stored in the small memory block line after line, and, when the following CCD chips 21, 23, 25 read the image of a same line, the already accumulated image signals of the CCD chips 22, 24 are read in synchronization. In this manner the signals of a same line can be delivered from the CCD chips 21–25.

Let us now consider the number of small memory blocks constituting each memory block. In an image reproduction in actual size, there is a time difference corresponding to four lines until a line, which is currently read by the preceding CCD chip 22, is read by the following CCD chip 21, so that there are required four more small memory block for the preceding CCD chip 22 than for the following CCD chip 21. Since the following CCD chip 21 requires the small memory blocks of two lines for signal reading and writing, the preceding CCD chip 22 will require small memory blocks of at least 6 lines.

Then let us consider a case of image reading with a modified image magnification, with a modified sub scanning speed. The image magnification in the main scanning direction can be modififed by skipping or increasing the number of image signals. Also in this case, the signals have to be read when the same line is read by the following CCD chips 21, 23, 25 as the line already read by the preceding CCD chips 22, 24. Thus, given a spatial distance of four lines, the modification rate of image magnification is limited to multiples of ¼. In consideration of the foregoing, the number of small memory blocks required for each CCD chip can be determined as follows:

|         | CCD 21/23/25 | CCD 22/24 |
|---------|--------------|-----------|
| ×0.5    | 2            | 4         |
| ×0.75   | 2            | 5         |
| ×1      | 2            | 6         |
| ×1.25   | 2            | 7         |
| ×1.5    | 2            | 8         |

In summary, there stand following equations:

$B = 1/N$ $M = L \cdot N + 2$ $A = a(L \cdot N + 2) + 2b$ wherein N is the distance in number of lines between the CCD chips, a is the number of preceding CCD chips, b is the number of following CCD chips, B is the image magnification, L is the largest image magnification, M is the amount of memory in number of lines required for the preceding CCD chips, and A is the total number of lines for the entire sensor. Consequently, in the present embodiment designed for three image magnifications of x0.75, x1 and x1.25, the memory blocks 172, 174 and 176 have a capacity of two lines each, while the memory blocks 173 and 175 have a capacity of seven lines each, thus small memory blocks of 20 lines in total per color.

Figure 18:
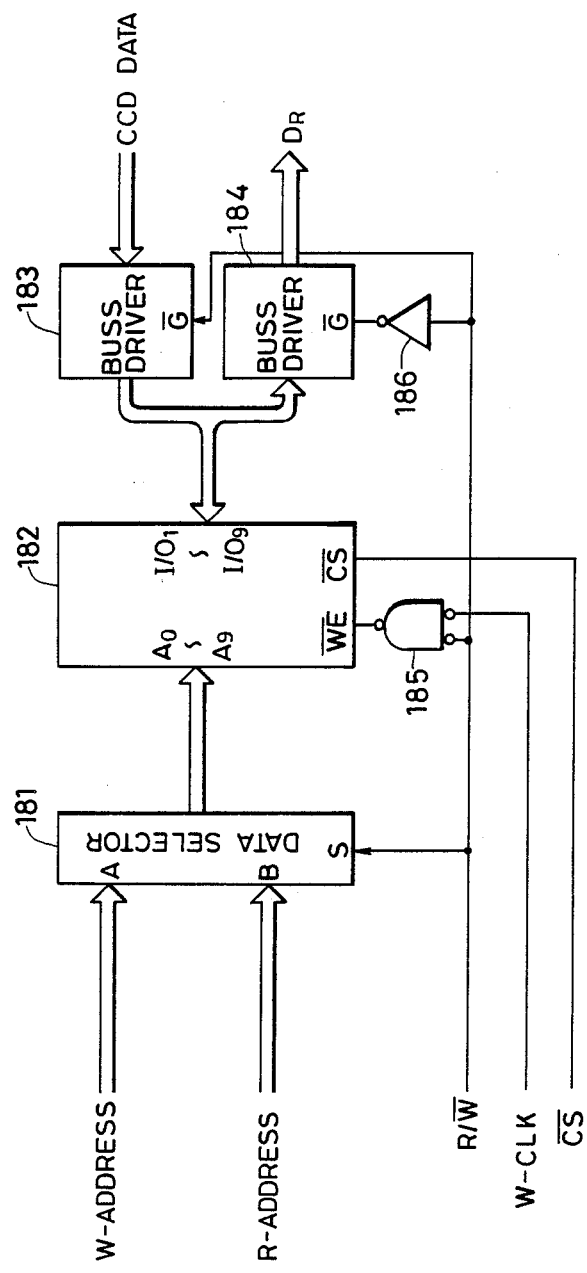
FIG. 18 is a block diagramm showing a small memory block.

FIG. 18 shows the structure of a small memory block, which is provided with a static RAM 182 of 8×1024 bits, a data selector 181 for selecting write addresses or read addresses of the static RAM 182, bus drivers 183, 184 for controlling the input and output of image signals, an OR circuit 185 and an inverter 186.

Figure 17:
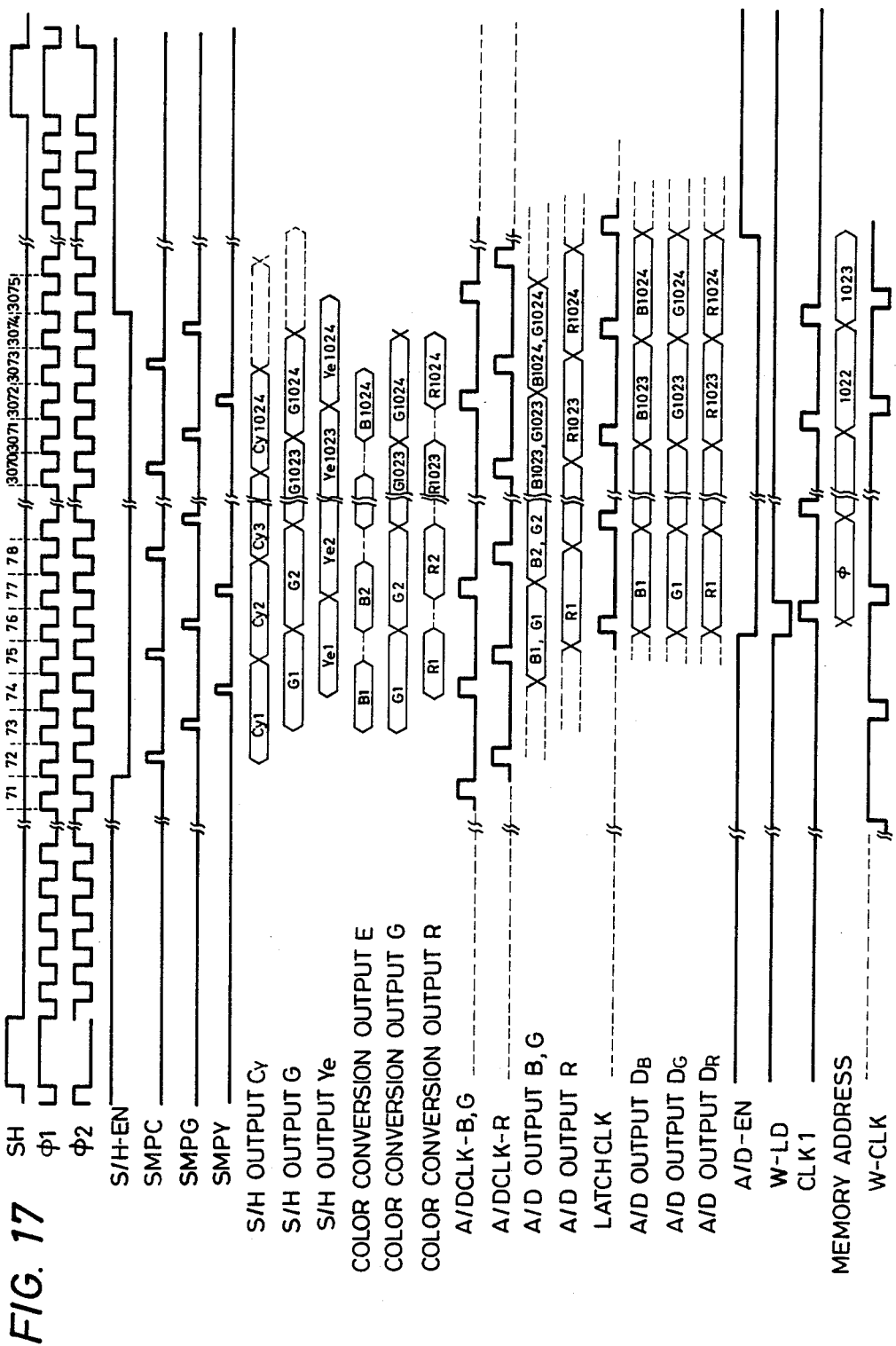
FIG. 17 is a timing chart showing the functions of various parts of the signal processing unit.
Figure 19:
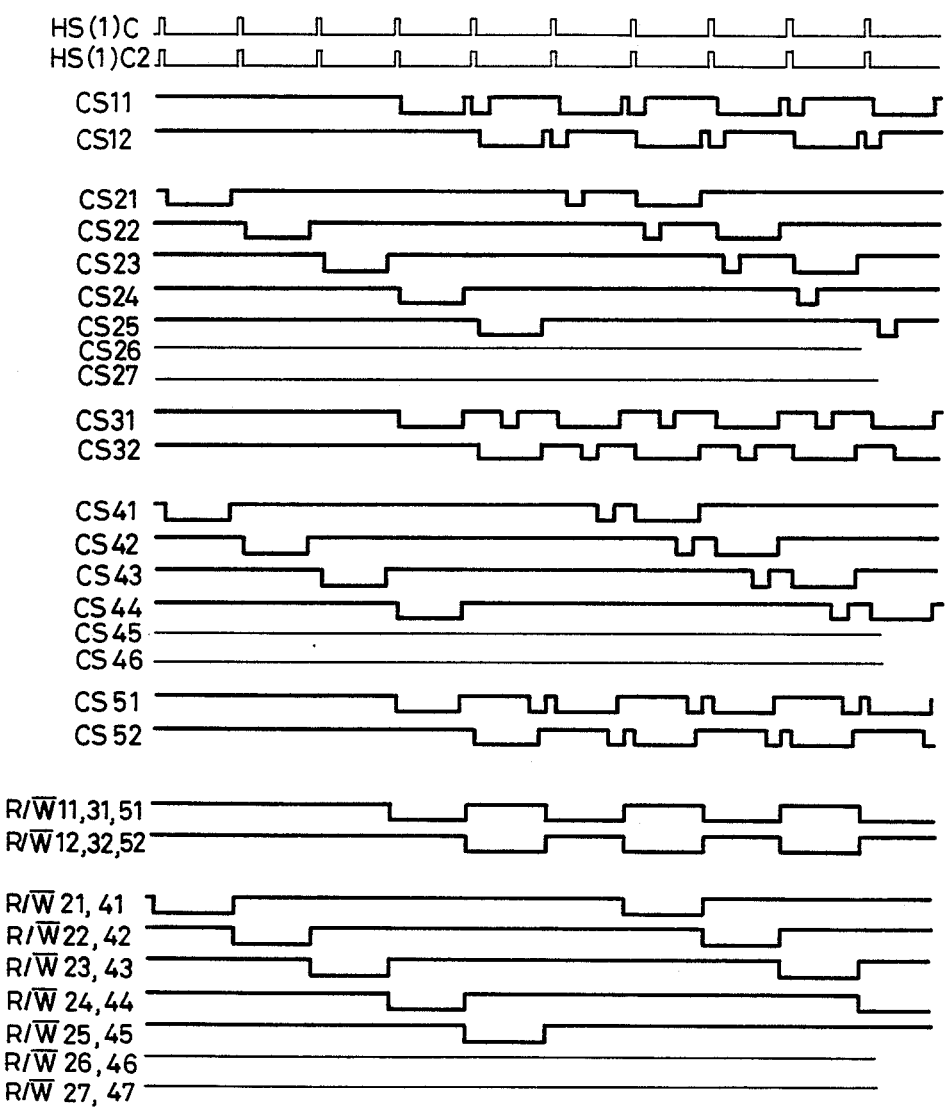
FIGS. 19, 20 and 21 are timing charts showing reading and writing functions of a memory.
Figure 20:
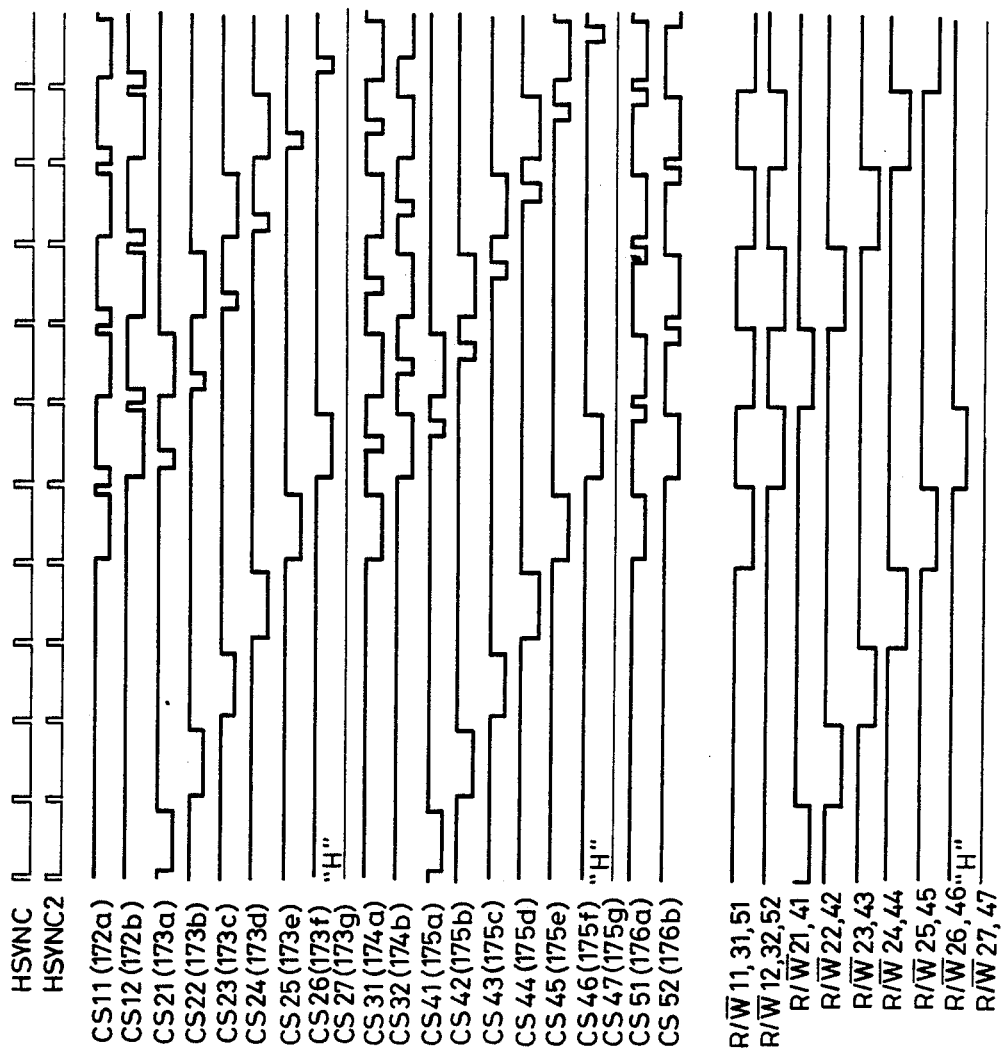
Figure 21:
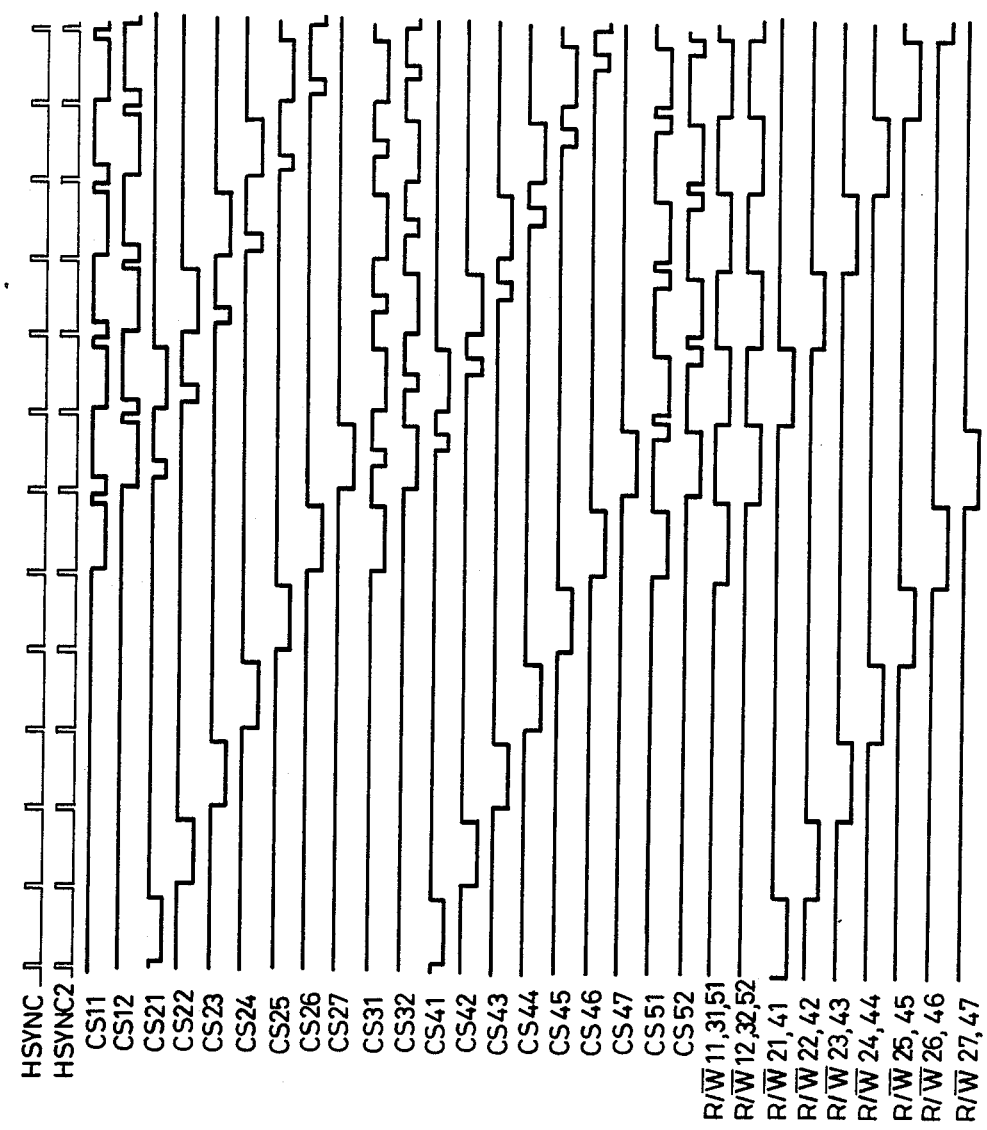

Now reference is made to circuit diagrams in FIGS. 16 and 18, and timing charts in FIGS. 17, 19, 20 and 21 for explaining the above-mentioned control. FIG. 17 shows a timing chart of the aforementioned sensor signal process unit, while FIG. 19 shows a timing chart of the read/write signal R/$\overline{W}$ and a chip select signal CS corresponding to each small memory block in image reading with a magnification ×0.75, FIG. 20 is a similar timing chart in image reading with a magnification ×1, and FIG. 21 is a similar timing chart in image reading with a magnification ×1.25.

In the following there will at first be explained the control on image reading with a magnification ×1, wherein the functions of the CCD chips 21–25 will be represented by those of the preceding CCD chip 22 and the following CCD chip 21.

Referring to FIG. 16, the address control for data writing into the static RAM of each memory block is achieved by counting of clock pulses CLK1 with the write-address counter 161, while the address control for data reading from the static RAM of each memory block is achieved by counting of clock pulses CLK2 with the read-address counter 162. Each small memory block contains signals of 1024 pixels, and, in the signal read-out, signals of 4752 pixels corresponding to the shorter side of A3 size have to be simultaneously read from five small memory blocks. Consequently the number of the clock pulses CLK2 supplied to the read-address counter 162 is 4.5 times of that of the clock pulses CLK1 supplied to the write-address counter 161, and the clock pulses CLK2 should have a frequency 1.5 times larger than that of the CCD driving clock pulses $\phi1$, $\phi2$. The read-address counter 162 has a capacity of 13 bits, of which the lower 10 bits are released as a read address while upper 3 bits are supplied to the memory block selector 163.

The memory block selector 163 decodes the data of upper 3 bits of the read-address counter to determine the data width in each of the memory blocks 172–176. More specifically, in comparison with the total amount of data of 1024×5=5120 bits from all the memory blocks, the output requires only 4752 bits so that the difference of 368 bits has to be removed. Consequently the width of entire data is limited to 4752 bits by deleting the initial and last parts from the data of each CCD chip, by designating the initial address released by the read-address counter 162.

Each of the aforementioned CS control units 164, 165, 166 is composed of a line counter-1 (1641) for counting signals HSYNC2 synchronized with line synchronization signals HSYNC for the printer, supplied from the digital signal process unit; a line counter-2 (1642) driven by a signal LD from the line counter-1 (1641); and a CS matric circuit 1643 for synthesizing the signals from the line counter-1 (1641), line counter-2 (1642) and memory block selector 163.

The number of CS control units corresponds to the number of image magnifications, and, in the present embodiment, is equal to three corresponding to the magnifications ×1, ×0.75 and ×1.25.

Each of read/write control units 168, 169, 170 synthesizes the output signals of the line counter-1 (1641) and of the line counter-2 (1642) of a corresponding CS control unit 164, 165 or 166 to prepare an R/$\overline{W}$ signal of each memory block. Similar to the CS control units 164–166, the number of the read/write control units 168, 160, 170 corresponds to the number of image magnifications.

The signals CS and R/$\overline{W}$ prepared by the CS control units 164–166 and read/write control units 168–170 corresponding to different image magnifications are selected by magnification and are supplied to the static RAM of each memory block.

FIG. 20 shows a timing chart of the signals CS and R/$\overline{W}$ in image reading with a magnification of ×1. FIGS. 11, 12 attached to the siganls CS and R/$\overline{W}$ correspond to the small memory blocks 172a, 172b; 21–27 to blocks 173a–173g; 31, 32 to blocks 174a, 174b; 41–47 to blocks 175a–175g; and 51, 52 to blocks 176a, 176b. When the preceding CCD chip 22 completes a first scanning, the CS signal 21 and the R/$\overline{W}$ signal 21, corresponding to the small memory block 173a of the memory block 173 in turn corresponding to the CCD chip 22, are both shifted to "0". In this state the port A of the data selector 181 shown in FIG. 18, or the write-address from the write address counter 161 is selected and the bus driver 183 is activated, whereby the data from the CCD chip are supplied through the bus driver 183 to the static RAM 182. Simultaneously the OR circuit 185 supplies, in the "0" state of the R/$\overline{W}$ signal, write pulses W-CLK (FIGS. 16 and 18) to a port WE of the static RAM 182. In this manner the signals obtained by scanning the first line with the CCD chip 22 are stored in the static RAM 182 of the small memory block 173a of the memory block 173. Simultaneously the signals obtained by scanning of the first line with the CCD chip 24 are stored in the small memory block 175a of the memory block 175.

Similarly, in the scanning of a second line, the signals CS 22 and R/$\overline{W}$ are selected, and the signals of the second line are stored in the small memory block 173b of the memory block 173 corresponding to the CCD 22. The images of third and fourth lines are similarly stored. Then, in the scanning of a fifth line, the following CCD chip 21 scans a line the same as that already scanned by the CCD chip 22 in the first scanning, and the signals obtained in the scanning are stored in the small memory block 172a of the memory block 172 corresponding to the CCD chip 21. In this manner the signals of the same line, i.e. signals of the small memory blocks 172a and 173a are made available.

In the scanning of a succeeding sixth line, the CS signal 11 assumes a state "0" while the R/$\overline{W}$ signal 11 assumes a state "1", whereby the port S of the data selector 181 is shifted to "1" to select the port B thereof. Thus the read-address from the read address counter 162 is supplied to the static RAM 182 of the small memory block 172a of the memory block 172 corresponding to the CCD chip 21. Simultaneously the signal $\overline{WE}$ assumes a state "1", while the signal $\overline{CS}$ assumes a state "0" and the bus driver 184 assumes a state "0" through the inverter 186, whereby the signals of the static RAM are released through the bus driver 184, in synchronization with the read addresses. Subsequently, when the CS signal 11 is shifted to "1", the CS signal 21 is shifted to "0", whereby the signals of the static RAM of the small memory block 173a are released in succession to the signals from the small memory block 173a.

Then the CS and R/$\overline{W}$ signals of other memory blocks are selected in succession according to the timing chart shown in FIG. 20 to effect the write-in and read-out of data, thus obtaining continuous signals of a line. The above-explained operation is conducted simultaneouly for three colors of red, green and blue as shown by $D_B$, $D_G$ and $D_R$ in FIG. 17.

FIGS. 19 and 21 show timing charts of the CS and R/$\overline{W}$ signal in the image reading with magnifications respectively of 0.75 and 1.25, and the control is effected according to the timing charts in a similar manner as in the case of FIG. 20.

Figure 22:
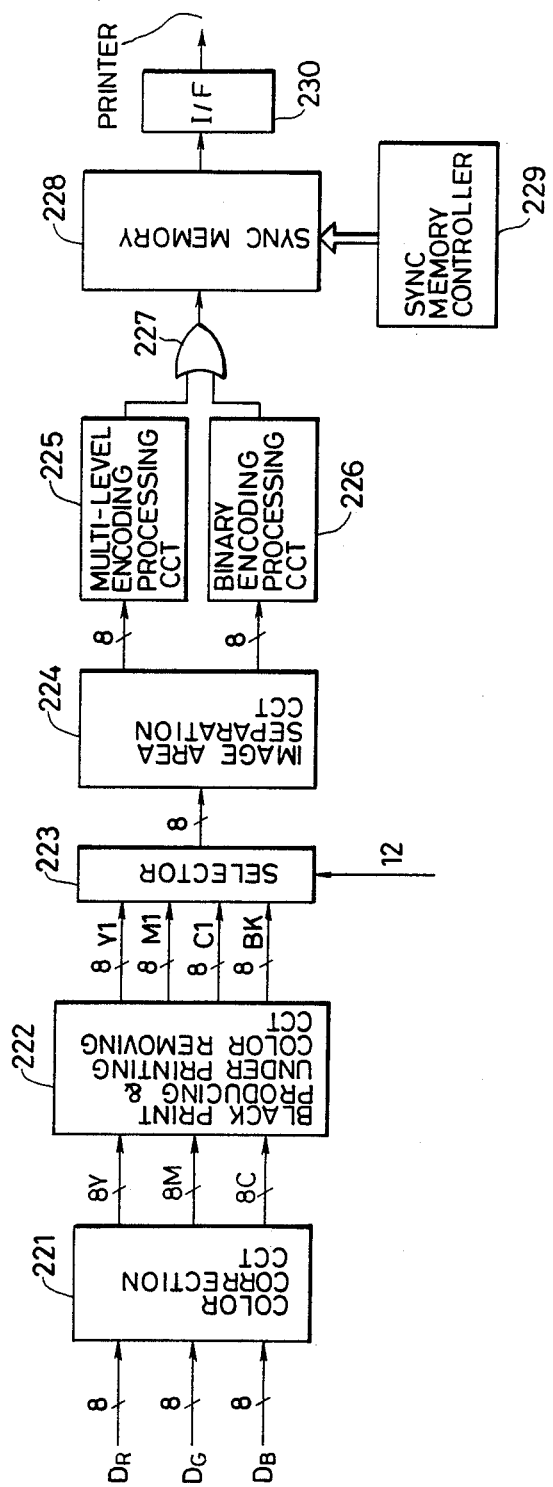
FIG. 22 is a block diagram showing a digital color signal processing circuit.

The color-separated pixel signals $D_R$, $D_G$ and $D_B$, having 8 bits each and matched in phase for the same pixel, are thus read from the memory unit 139 and subjected to a succeeding process shown in FIG. 22. A color correction circuit 221 performs a so-called masking process which will be explained in the following paragraph (1) to generate a yellow signal Y, a magenta signal M and a cyan signal C. Also a black generating-background removing circuit 222 effects a process explained in the following paragraph (2).

(1) Masking: Input pixel signals $D_R$, $D_G$, $D_B$ are subjected to a following matrix operation to absorb unnecessary color components of printing toners, thus producing the signals Y, M, C:

$$\begin{pmatrix} Y \\ M \\ C \end{pmatrix} = \begin{pmatrix} a1 & a2 & a3 \\ b1 & b2 & b3 \\ c1 & c2 & c3 \end{pmatrix} \begin{pmatrix} D_R \\ D_G \\ D_B \end{pmatrix}$$

wherein coefficients $a_i$, $b_i$ and $c_i$ (i=1-3) are masking coefficients to be appropriately determined.

(2) Generation of black print and removal of background color: Color signals Y', M' and C', indicating the amounts of toners to be printed, are determined by Y'=Y-$\alpha$k, M'=M-$\beta$k and C'=C-$\gamma$k, wherein k is the minimum value of the Y, M and C signals, i.e. k=MIN(Y, M, C). Also the amount of black print is determined by BK=$\delta$k, wherein $\alpha$, $\beta$, $\gamma$ and $\delta$ are to be appropriately determined.

The image signals Y', M', C' and BK constitute basic data of a toner image to be printed on the printer. In the present embodiment, as will be explained later, the color printer does not print the toner images of yellow, magenta, cyan and black simultaneously but transfers these images in succession onto a transfer sheet to obtain a final color printed image.

Consequently the color signals Y', M', C' and BK have to be selected according to the function of the color printer, and a selector 223 is provided to select one of the signals supplied from the circuit 222. Therefore, in the present embodiment, reading and printout of a color image requires four exposure operations of the original image and four toner image forming processes.

The color-separated image selected corresponding to the operation of the color printer 122 is separated, in an image area separator 224, into character areas composed of characters, symbols, lines etc. and halftone image areas composed for example of photographs. The halftone image is subjected to a multi-level encoding process, generally called dither process, in a multi-level encoding circuit 225 while the character image is subjected to binary encoding with a fixed threshold value in a binary encoding circuit 26, whereby the image signals transmitted to 8 bits or 256 levels are converted into "1" or "0" for each pixel. The output signals of circuit 225, 226 are supplied through an OR circuit 227 and stored in a synchronized memory 228 under the control of a synchronization controller 229, and then supplied through an interface 230 to the printer in synchronization therewith.

Figure 23:
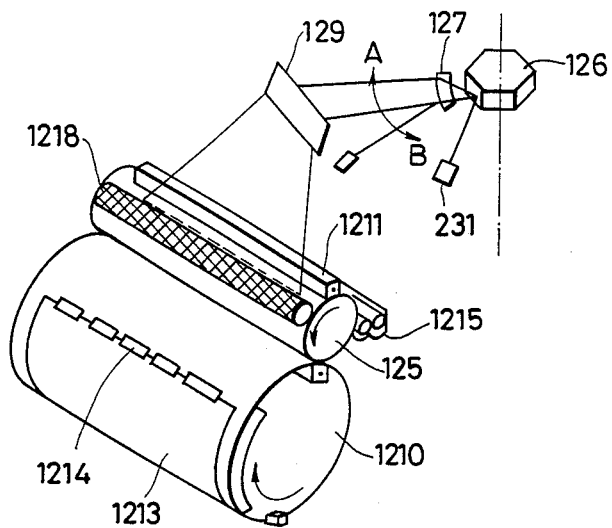
FIG. 23 is a perspective view showing the structure of a latent image forming unit in a printer.

As shown in FIG. 12, the present embodiment employs an electrophotographic laser beam color printer, provided with a photosensitive drum 125. The process of latent image formation will be explained in the following in relation to FIG. 23. The color-separated image read by the above-explained color image reader 121 is converted into a dot image through the blocks shown in FIG. 22, and the dot signals are used finally for modulating a semiconductor laser shown in FIG. 23. A laser beam modulated corresponding to the image is deflected by a polygonal mirror 126, rotated at a high speed, to perform a scanning operation as indicated by an arrow A–B shown in FIG. 23 and provide an imagewise exposure to the surface of the photosensitive drum 125 uniformly charged in advance by a charger 1211.

The horizontal scanning with the laser beam is conducted with a pitch of 1/16 mm, corresponding to the pitch of horizontal image reading. On the other hand the photosensitive drum 125 is rotated at a constant speed in a direction of the arrow, so that a two-dimensional image is exposed onto the photosensitive drum 125, through a main scanning achieved by the scanning motion of said laser beam and a sub scanning achieved by rotation of the photosensitive drum 125.

Through laser exposure, there is formed, on the photosensitive drum 125, an electrostatic latent image, which is converted into a toner image corresponding to input image signals, by image development with a developing sleeve 1218 of a developing unit 1240. As an example, in response to a first original exposure in the color image reader, a dot image of the yellow component in the original is formed on the photosensitive drum 125 by means of the laser 231, and is rendered visible by a yellow developing sleeve 1218Y. The yellow image on the photosensitive drum 125 is then transferred onto a sheet 1213 wound on a transfer drum 1210, under the effect of a transfer charger 1221 provided close to the contact point of the photosensitive drum 125 and the transfer drum 1210. The same process is repeated for each of the magenta, cyan and black images, and the obtained images are superposed onto said sheet 1213 to obtain a color image composed of four color toners.

After the transfer of said four color images, the sheet 1213 is peeled off from the transfer drum 1210 by means of a peeling finger 1222 shown in FIG. 12, is then transported by a conveyor belt 1223 to an image fixing unit 1224, and the color toner images are fused and fixed to said sheet by heated pressure rollers 1225, 1226.

As shown in FIG. 12, there are provided cassettes 1229, 1230 for housing the sheets, feed rollers 1231, 1232 and timing rollers 1233–1235, and a sheet transported by means of the above-mentioned components is guided by sheet guide members 1236, then gripped at the leading edge by a gripper 1214 and wound onto the transfer drum 1210, thus entering an image forming step. A developer unit 1240 shown in FIG. 12 for developing the electrostatic latent images formed on the photosensitive drum 125 by the exposures with said laser beam into different colors, is rendered rotatable by 90° around a point P, and is provided with developing sleeves 1218Y, 1218M, 1218C and 1218BK for effecting the color developments in contact with the photosensitive drum 125; toner hoppers 1220 Y, 1220M, 1220C and 1220BK for containing toners; and screws 1219 for transporting toners. There is also provided a cleaner 1215 for removing excessive toner from the photosensitive drum 125.

In the above-explained structure, in case of forming a magenta toner image, the developer unit is rotated around the point P, whereby the developing sleeve 1218M of a magenta developer unit is brought into contact with the photosensitive drum 125. Thus the electrostatic latent image on the photosensitive drum 125 is developed with magenta toner.

The cyan and black images are likewise obtained.

As detailed explained in the foregoing, it is rendered possible to faithfully read the original image and to form satisfactory image signals for image reproduction. Also the image reading apparatus of the present invention is capable of image reading with a modified magnification and of color image reading.

What is claimed is:

1. A color image reading apparatus comprising:
reading means for reading a color image, wherein said reading means includes plural linear sensors each capable of generating plural analog color component signals arranged such that said plural linear sensors read a line of the color image in a divided manner and such that adjacent linear sensors read mutually different lines of the color image;
separating means for separating the plural analog color component signals generated by said plural linear sensors into analog color component signals of each color;
conversion means for converting the analog color component signals of each color separated by said separating means into digital color component signals of each color, respectively;
forming means for forming plural continuous digital color component signals representing a line of the color image from the digital color component signals of each color converted by said conversion means; and
digital color processing means for digital color processing of the plural continuous digital color component signals to form digital color image signals usable for reproduction of the color image.

2. A color image reading apparatus according to claim 1, wherein said reading means comprises means for illuminating the color image and filter means for separating light reflected from the color image into color components.

3. A color image reading apparatus according to claim 1, further cmprising means for reproducing the color image from the digital color image signals formed by said color processing means.

4. A color image reading apparatus comprising:
reading means for reading a color image, wherein said reading means includes plural linear sensors each capable of generating plural analog color component signals arranged such that said plural linear sensors read a line of the color image in a divided manner and such that adjacent linear sensors read mutually different lines of the color image;
plural analog processing means, each being capable of analog color processing of the plural analog color component signals generated by an associated one of said plural linear sensors;
conversion means for converting the plural analog color component signals respectively processed by corresponding one of said plural analog processing means into plural digital color component signals;
forming means for forming plural continuous digital color component signals representing a line of the color image from the plural digital color component signals converted by said conversion means; and
digital color processing means for digital color processing of the plural continuous digital color component signals to form digital color image signals usable for reproduction of the color image.

5. A color image reading apparatus according to claim 4, wherein said reading means comprises means for illuminating the color image and filter means for separating light reflected from the color image into color components.

6. A color image reading apparatus according to claim 4, wherein said plural analog processing means are each adapted to separate plural analog color component signals generated by said plural linear sensors.

7. A color image reading apparatus according to claim 4, further comprising means for reproducing the color image based on the digital color image signals.

8. A color image reading apparatus, comprising:
reading means for reading a color image, wherein said reading means includes plural linear sensors each capable of generating plural analog color component signals arranged such that said plural linear sensors read a line of the color image in a divided manner and such that adjacent linear sensors read mutually different lines of the color image;
means for providing relative motion between said plural linear sensors and the color image in a sub-scanning direction perpendicular to a main-scanning direction of said plural linear sensors;
separating means for separating the plural color component signals generated by said plural linear sensors into color component signals of each color;
plural forming means for correcting a discrepancy between the color component signals of each color separated by said separating means due to the reading of mutually different lines of the color image by adjacent linear sensors, and for forming continuous color component signals representing a line of the color image; and
color processing means for color processing of the continuous color component signals to form color image signals usable for reproduction of the color image.

9. A color image reading apparatus according to claim 8, wherein said reading means comprises means for illuminating the color image and filter means for separating light reflected from the color image into color components.

10. A color image reading apparatus according to claim 8, further comprising means for controlling the operation of said plural forming means in accordance with a magnification at which said reading means reads the color image.

11. A color image reading apparatus according to claim 8, wherein said plural forming means has means for delaying the color component signals of each color separated by said separating means and generated by at least one of said plural linear sensors which reads one line of the color image prior to reading of the one line by at least another one of said plural linear sensors.

* * * * *

UNITED STATES PATENT AND TRADEMARK OFFICE
CERTIFICATE OF CORRECTION

PATENT NO. : 4,891,690
DATED : January 2, 1990
INVENTOR(S) : SHIZUO HASEGAWA ET AL.    Page 1 of 2

It is certified that error appears in the above-identified patent and that said Letters Patent is hereby corrected as shown below:

COLUMN 4

Line 8, "bitsof" should read --bits of--.

COLUMN 7

Line 28, "136a-134c" should read --136a-136c--.

COLUMN 9

Line 42, "sensor" should read --sensors--.

COLUMN 10

Line 36, "$\beta(V_{G'}-V_{DK})=\beta(V_G+V_{DK}-D_{DK})=\beta V_G \quad (2)$" should read --$\beta(V_{G'}-V_{DK})=\beta(V_G+V_{DK}-V_{DK})=\beta V_G \quad (2)$--.

COLUMN 11

Line 13, "ratio signals" should read --ratio to signals--.
Line 55, "relesed" should read --released--.
Line 60, "166" should read --1/3--.
Line 66, "CLK2," should read --CLK1,--.

COLUMN 14

Line 58, "magnification and" should read --magnification selectors 167, 171 according to a desired magnification and--.

UNITED STATES PATENT AND TRADEMARK OFFICE
CERTIFICATE OF CORRECTION

PATENT NO. : 4,891,690
DATED : January 2, 1990
INVENTOR(S) : SHIZUO HASEGAWA ET AL.   Page 2 of 2

It is certified that error appears in the above-identified patent and that said Letters Patent is hereby corrected as shown below:

COLUMN 15

Line 18, "R/$\overline{W}$" should read --R/$\overline{W}$ 22--.

COLUMN 16

Line 45, "circuit 26," should read --circuit 226,--.
Line 46, "to" should read --in--.

COLUMN 18

Line 51, "one" should read --ones--.

Signed and Sealed this

Twenty-sixth Day of November, 1991

Attest:

HARRY F. MANBECK, JR.

*Attesting Officer*       *Commissioner of Patents and Trademarks*